United States Patent
Li et al.

(10) Patent No.: US 12,484,109 B2
(45) Date of Patent: Nov. 25, 2025

(54) PS-PDCCH CONFIGURATION METHOD, TERMINAL DEVICE, AND NETWORK SIDE DEVICE

(71) Applicant: VIVO MOBILE COMMUNICATION CO., LTD., Dongguan (CN)

(72) Inventors: Dongru Li, Dongguan (CN); Xueming Pan, Dongguan (CN); Dajie Jiang, Dongguan (CN); Xiaodong Shen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 679 days.

(21) Appl. No.: 17/891,104

(22) Filed: Aug. 18, 2022

(65) Prior Publication Data
US 2022/0408515 A1 Dec. 22, 2022

Related U.S. Application Data

(63) Continuation of application No. PCT/CN2021/077428, filed on Feb. 23, 2021.

(30) Foreign Application Priority Data

Feb. 25, 2020 (CN) .......................... 202010117782.2

(51) Int. Cl.
*H04W 76/28* (2018.01)
*H04W 52/02* (2009.01)

(52) U.S. Cl.
CPC ....... *H04W 76/28* (2018.02); *H04W 52/0229* (2013.01)

(58) Field of Classification Search
CPC ........................... H04W 76/28; H04W 52/0229
See application file for complete search history.

(56) References Cited

U.S. PATENT DOCUMENTS

| | | | |
|---|---|---|---|
| 2018/0368112 A1 | 12/2018 | Sebeni et al. | |
| 2020/0037396 A1 | 1/2020 | Islam et al. | |
| 2020/0045768 A1* | 2/2020 | He | H04W 76/28 |
| 2023/0007724 A1* | 1/2023 | Li | H04W 76/28 |

FOREIGN PATENT DOCUMENTS

EP   3008967 A1   4/2016

OTHER PUBLICATIONS

Huawei et al., "Discussion on low latency SCell activation and efficient SCell management", 3GPP TSG RAN WG1 Meeting #98bis, Chongqing, China, Oct. 14-20, 2019, R1-1910039 (Year: 2019).*
International Search Report issued in corresponding International Application No. PCT/CN2021/077428, mailed May 7, 2021, 4 pages.
VIVO, "Remaining Aspects of PDCCH-Based Power Saving Signal", 3GPP TSG RAN WG1 #98bis, R1-1910233, Oct. 20, 2019.
VIVO, "Maintenance of PDCCH-Based Power Saving Signal", 3GPP TSG RAN WG1 #100 e-Meeting, R1-2000337, Mar. 6, 2020.

* cited by examiner

*Primary Examiner* — Joseph A Bednash
(74) *Attorney, Agent, or Firm* — IPX PLLC

(57) ABSTRACT

A Power Saving Physical Downlink Control Channel (PS-PDCCH) configuration method, a terminal device, and a network side device are provided. The PS-PDCCH configuration method includes: obtaining a first configuration parameter. The first configuration parameter is used to indicate an object that can be indicated by a PS-PDCCH. The object includes at least one of N Discontinuous Reception Groups (DRX groups) and M cells. Both N and M are positive integers.

20 Claims, 16 Drawing Sheets

Obtain a first configuration parameter, where the first configuration parameter is used to indicate an object that can be indicated by a PS-PDCCH ~ 601

PS-PDCCH CONFIGURATION METHOD, TERMINAL DEVICE, AND NETWORK SIDE DEVICE

CROSS-REFERENCE TO RELATED APPLICATIONS

This application is a continuation of International Application No. PCT/CN2021/077428, filed on Feb. 23, 2021, which claims priority to Chinese Patent Application No. 202010117782.2, filed on Feb. 25, 2020. The entire contents of each of the above-referenced applications are expressly incorporated herein by reference.

TECHNICAL FIELD

The present disclosure relates to the field of communications technologies, and in particular, to a Power Saving Physical Downlink Control Channel (PS-PDCCH) configuration method, a terminal device, and a network side device.

BACKGROUND

In a mobile communications system, one or more Discontinuous Reception groups (DRX groups) may be configured for one Cell Group (CG), where DRX configuration parameters of different DRX groups may be separately configured, for example, a DRX On duration timer (drx-ondurationtimer) and a DRX inactivity timer (drx-InactivityTimer). The DRX group may be understood as a cell combination formed by classifying cells in the cell group according to a specified feature. For example, as shown in FIG. 1, the cells in the cell group are grouped according to different Frequency Range (FR) configurations. It should be noted that the cell combination formed by classifying the cells in the cell group according to the specified feature is not limited to being referred to as the DRX group.

To further save power in a DRX configuration, a concept of a PS-PDCCH, that is, a Wake-Up Signal (WUS), is introduced. A wake-up indication field in Downlink Control Information (DCI) 2_6 of the PS-PDCCH is used to indicate whether a drx-ondurationtimer in a next DRX cycle is enabled. A Secondary Cell dormancy indication (SCell dormancy indication) field may be further configured in the DCI format 2_6, to indicate a dormancy behavior in unit of a secondary cell group (SCell group). However, in the prior art, there is no related solution for configuring an indication range of PS-PDCCH in a case that one or more DRX groups are configured in one cell group.

SUMMARY

Embodiments of the present disclosure provide a PS-PDCCH configuration method, a terminal device, and a network side device, to provide a manner of configuring an indication range of a PS-PDCCH in a case that one or more DRX groups are configured in one cell group, thereby improving flexibility of executing indication based on the PS-PDCCH.

To resolve the foregoing technical problem, the present disclosure is implemented as follows:

According to a first aspect, an embodiment of the present disclosure provides a PS-PDCCH configuration method. The method is applied to a terminal device and includes:
  obtaining a first configuration parameter, where
  the first configuration parameter is used to indicate an object that can be indicated by a power saving physical downlink control channel PS-PDCCH, the object includes at least one of N discontinuous reception groups DRX groups and M cells, and both N and M are positive integers.

According to a second aspect, an embodiment of the present disclosure further provides a PS-PDCCH configuration method. The method is applied to a network side device and includes:
  sending a first configuration parameter to a terminal device, where
  the first configuration parameter is used to indicate an object that can be indicated by a power saving physical downlink control channel PS-PDCCH, the object includes at least one of N discontinuous reception groups DRX groups and M cells, and both N and M are positive integers.

According to a third aspect, an embodiment of the present disclosure further provides a terminal device. The terminal device includes:
  an obtaining module, configured to obtain a first configuration parameter, where
  the first configuration parameter is used to indicate an object that can be indicated by a power saving physical downlink control channel PS-PDCCH, the object includes at least one of N discontinuous reception groups DRX groups and M cells, and both N and M are positive integers.

According to a fourth aspect, an embodiment of the present disclosure further provides a network side device. The network side device includes:
  a first sending module, configured to send a first configuration parameter to a terminal device, where
  the first configuration parameter is used to indicate an object that can be indicated by a power saving physical downlink control channel PS-PDCCH, the object includes at least one of N discontinuous reception groups DRX groups and M cells, and both N and M are positive integers.

According to a fifth aspect, an embodiment of the present disclosure further provides a terminal device, including a processor, a memory, and a computer program that is stored in the memory and that can be run on the processor, where when the computer program is executed by the processor, the steps of the PS-PDCCH configuration method provided in the first aspect are implemented.

According to a sixth aspect, an embodiment of the present disclosure further provides a network side device, including a processor, a memory, and a computer program that is stored in the memory and that can be run on the processor, where when the computer program is executed by the processor, the steps of the PS-PDCCH configuration method provided in the second aspect are implemented.

According to a seventh aspect, an embodiment of the present disclosure further provides a computer-readable storage medium, where the computer-readable storage medium stores a computer program, and when the computer program is executed by a processor, the steps of the PS-PDCCH configuration method provided in the first aspect or the steps of the PS-PDCCH configuration method provided in the second aspect are implemented.

In the embodiments of the present disclosure, an obtained first configuration parameter indicates at least one of N DRX groups and M cells that can be indicated by a PS-PDCCH. In this way, a manner of configuring an indication range of a PS-PDCCH in a case that one or more DRX groups are configured in one cell group is provided, thereby improving flexibility of indicating at least one of a DRX group and a cell based on the PS-PDCCH.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the specification and claims of this application, the terms "first", "second", and the like are intended to distinguish between similar objects but do not necessarily describe a specific order or sequence. It should be understood that the data termed in such a way is interchangeable in proper circumstances so that the embodiments of this application described herein can be implemented, for example, in an order other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in the specification and claims, "and/or" is used to indicate at least one of connected objects, for example, A and/or B and/or C indicate seven cases: only A, only B, only C, A and B, B and C, A and C, and A, B and C.

Figure 1:
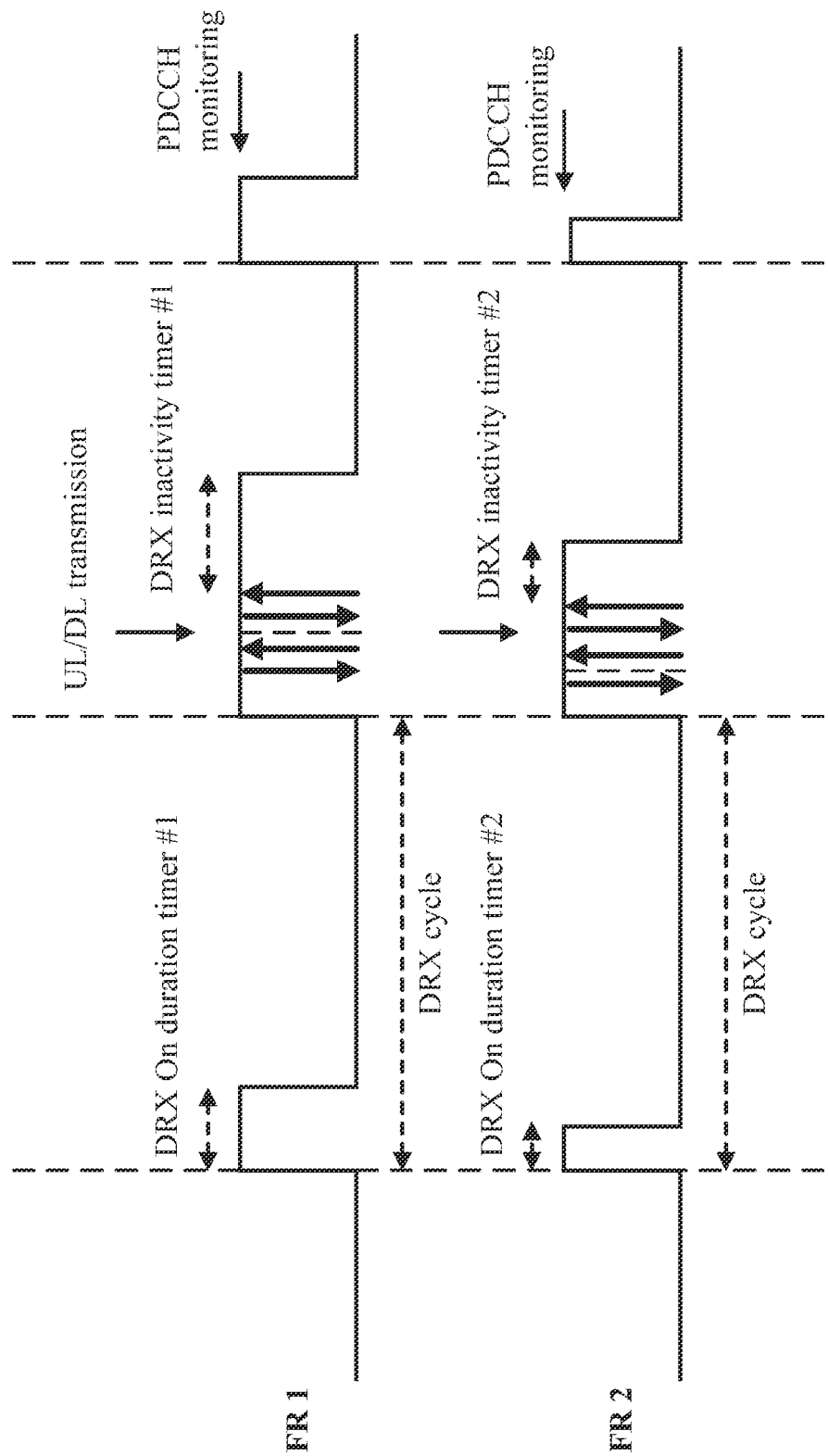
FIG. 1 is a schematic diagram of two DRX group configurations in the related art.
Figure 2:
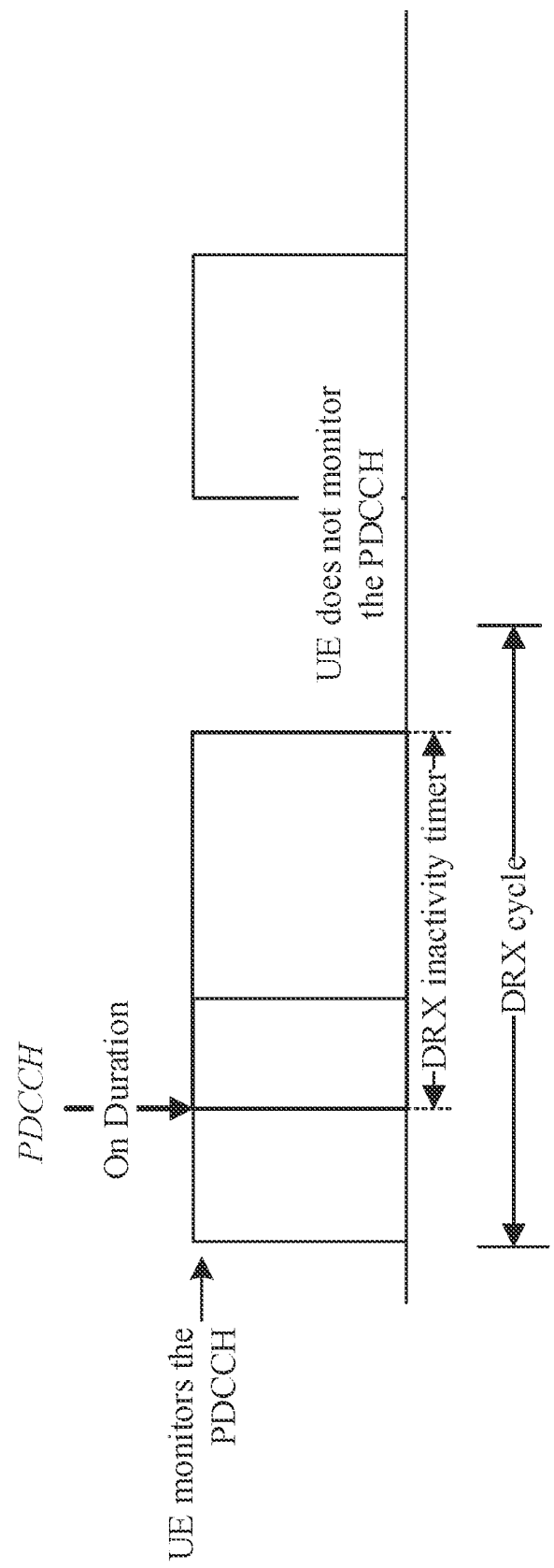
FIG. 2 is a schematic diagram of a DRX cycle according to an embodiment of the present disclosure.

For ease of understanding, the following describes some content in the embodiments of the present disclosure.
I. Discontinuous Reception (DRX) of a Radio Resource Control (RRC) Connection State.
DRX Basic Model:

A typical DRX cycle may be shown in FIG. 2. A DRX basic mechanism is to configure a DRX cycle for UE in an RRC_CONNECTED state. The DRX cycle includes on duration and a sleep time (Opportunity for DRX, that is, a low level in FIG. 2). During the on duration, User Equipment (UE) monitors and receives a PDCCH (an activation period). During the opportunity for DRX, the UE does not receive data of a downlink channel to reduce power consumption (a sleep period).
Parameter Configuration:

DRX On duration timer (drx-ondurationtimer): When a DRX function is configured, the drx-ondurationtimer indicates duration in which corresponding Media Access Control (MAC) is in a wake-up state in one DRX cycle, and corresponds to the On duration in FIG. 2. The drx-ondurationtimer may calculate a start time point according to a specific formula. Once started, the drx-ondurationtimer continues to run until a timeout occurs, and restart is not allowed halfway.

DRX inactivity timer (drx-InactivityTimer): The drx-InactivityTimer indicates duration in which after receiving a PDCCH indicating new transmission, corresponding MAC needs to monitor the PDCCH. The drx-InactivityTimer starts or restarts on the first symbol after receiving of the PDCCH indicating new transmission (UL or DL) ends. When the corresponding MAC receives a DRX command or a long DRX command MAC Control Element (CE), the drx-InactivityTimer is stopped. When the drx-InactivityTimer expires, if a short DRX cycle is configured for the corresponding MAC, the corresponding MAC enters a short DRX cycle; otherwise, the corresponding MAC enters a long DRX cycle.

It should be noted that the foregoing two timers are in unit of milliseconds. For example, the two timers may be shown as follows:

```
drx-ondurationtimer CHOICE {
subMilliSeconds INTEGER (1..31),
milliseconds ENUMERATED {
ms1, ms2, ms3, ms4, ms5, ms6, ms8, ms10,
ms20, ms30, ms40, ms50, ms60, ms80, ms100,
ms200, ms300, ms400, ms500, ms600, ms800,
ms1000, ms1200, ms1600, spare8, spare7,
spare6, spare5, spare4, spare3, spare2, spare1}
},
drx-InactivityTimer ENUMERATED {
ms0, ms1, ms2, ms3, ms4, ms5, ms6, ms8,
ms10, ms20, ms30, ms40, ms50, ms60, ms80,
ms100, ms200, ms300, ms500, ms750, ms1280,
ms1920, ms2560, spare9, spare8,
spare7,spare6, spare5, spare4, spare3, spare2,
spare1}.
```

2. DCI 2_6 of a PS-PDCCH (PS-PDCCH of DCI 2_6).

To further save power in a DRX configuration, a concept of a PS-PDCCH, that is, WUS, is proposed. The WUS corresponds to the DCI 2_6, and the DCI 2_6 can only be configured for a Primary Cell (PCell). The WUS may control whether to enable a drx-ondurationtimer in a next DRX cycle. The DCI 2_6 is outside an active time (outside active time). It should be noted that the PS-PDCCH can be configured only when a DRX in a Connected DRX (CDRX) is configured.

Optionally, a DCI format 2_6 may include two fields, and the two fields include:
a wake-up indication field (1 bit); and
a SCell dormancy indication field (0, 1, 2, 3, 4, or 5 bits).
Optionally, the DCI format 2_6 is used to notify power saving information outside a DRX active time of one or more UE.

The following information is transmitted by scrambling a DCI format 2_6 with Cyclic Redundancy Check (CRC) by using a Power Saving Radio Network Temporary Identifier (PS-RNTI):
a block number 1, a block number 2, . . . , and a block number N, where a start position of a block is determined by a Power Saving Position DCI 2_6 (PSPositionDCI 2_6) parameter provided by a higher layer for UE configured with the block.

If the UE is configured with higher layer parameters PS-RNTI and DCI format 2_6, the higher layer configures one block for the UE and defines the following fields for the block:
a wake-up indication field (wake-up indication)-1 bit; and
a secondary cell dormancy indication field (SCell dormancy indication)-0 bit if a higher layer parameter: secondary cell for dormancy outside active time (SCell-groups-for-dormancy-outside-active-time) is not configured, otherwise, a bitmap of 1, 2, 3, 4, or 5 bits determined according to a higher layer parameter: SCell-groups-for-dormancy-outside-active-time, where each bit corresponds to a SCell group configured by the higher layer parameter: SCell-groups-for-dormancy-outside-active-time, and a bitmap of the Most Significant Bit (MSB) to the Least Significant Bit (LSB) corresponds to a first configured SCell group to a last configured SCell group.

Figure 3:
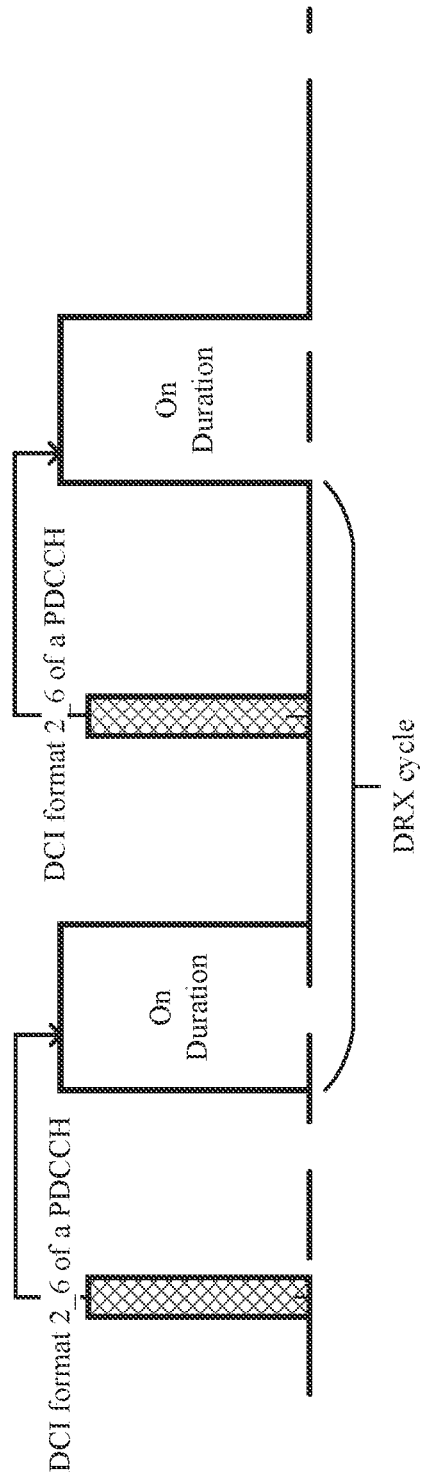
FIG. 3 is a schematic diagram of a WUS indication in a PS-PDCCH according to an embodiment of the present disclosure.

A DCI format corresponding to a PS-PDCCH is DCI 2_6, that is, a PS-RNTI is used to scramble a DCI format 2_6 with CRC (the DCI format 2_6 with CRC scrambled by PS-RNTI). The PS-RNTI is an RNTI that is allocated by a network side device to UE and is used for a power saving characteristic, and the DCI scrambled by the PS-RNTI carries a wake-up/sleep indication of the network side device for the UE. The UE determines, according to the indication, whether to enable an On duration timer (drx-ondurationtimer) in a next DRX cycle, and whether to enable the drx-ondurationtimer is whether to monitor a PDCCH during On duration, as shown in FIG. 3.

Before a DRX group is configured, DRX and a PS_PDCCH are configured based on each cell group of a terminal.

3. PS-PDCCH Detection.

Case 1: If UE is provided with Search Space sets (SS sets) to detect one or more PS-PDCCH Monitoring Occasions (MO) of a DCI format 2_6, and the UE does not detect the DCI format 2_6 (PS-PDCCH), a behavior of the UE is indicated by a power saving wake-up or not (ps-WakeupOrNot) parameter configured by RRC whether to start a drx-ondurationtimer in a next DRX cycle, or does not enable a drx-ondurationtimer in a next DRX cycle in a case that no ps-WakeupOrNot is configured for the UE.

Figure 4:
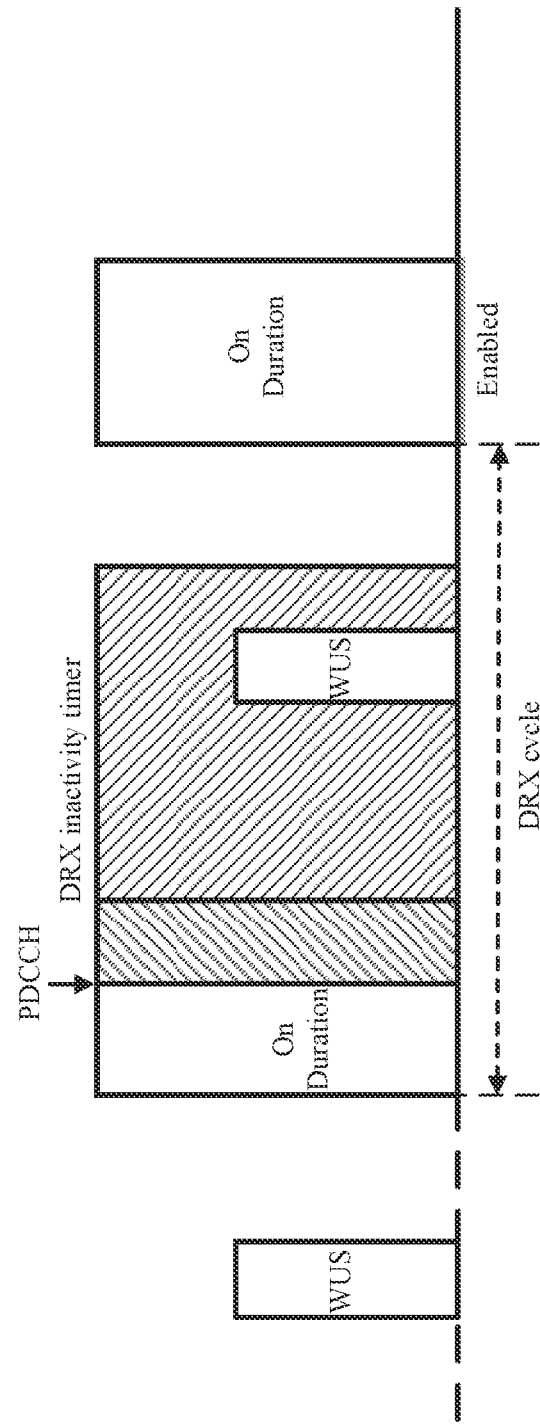
FIG. 4 is a schematic diagram in which there is no PDCCH MO according to an embodiment of the present disclosure.

Case 2: If UE is provided with SS sets to detect one or more PDCCH MOs of a DCI format 2_6, a behavior of the UE is to enable a drx-ondurationtimer in a next DRX cycle in the following two cases: 1. All the PDCCH MOs do not need to be monitored; 2. There is no PDCCH MO, as shown in FIG. 4.

Figures 5, 6:
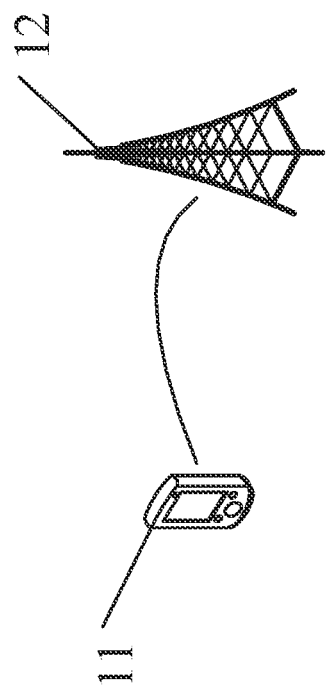
FIG. 5 is a structural diagram of a network system to which the embodiments of the present disclosure can be applied.
FIG. 6 is a schematic flowchart of a PS-PDCCH configuration method according to an embodiment of the present disclosure.

The embodiments of the present disclosure provide a PS-PDCCH configuration method. Referring to FIG. 5, FIG. 5 is a structural diagram of a network system to which the embodiments of the present disclosure can be applied. As shown in FIG. 5, the network system includes a terminal device 11 and a network side device 12. The terminal device 11 may be a user side device such as a mobile phone, a tablet personal computer, a laptop computer, a Personal Digital Assistant (PDA), a Mobile Internet Device (MID), or a wearable device. It should be noted that a specific type of the terminal device 11 is not limited in the embodiments of the present disclosure. The network side device 12 may be a base station, for example, a macro base station, an LTE eNB, a 5G NR NB, or a gNB. The network side device 12 may be a small cell, for example, a Low Power Node (LPN) pico or a femto, or the network side device 12 may be an Access Point (AP). The base station may be a network node formed by a Central Unit (CU) and a plurality of TRPs that are managed and controlled by the CU. It should be noted that a specific type of the network side device 12 is not limited in the embodiments of the present disclosure.

An embodiment of the present disclosure provides a PS-PDCCH configuration method, applied to a terminal device. Referring to FIG. 6, FIG. 6 is a flowchart of a PS-PDCCH configuration method according to an embodiment of the present disclosure. As shown in FIG. 6, the method includes the following steps.

Step 601: Obtain a first configuration parameter, where the first configuration parameter is used to indicate an object that can be indicated by a PS-PDCCH, the object includes at least one of N DRX groups and M cells, and both N and M are positive integers.

In this embodiment, the first configuration parameter may be predefined by a protocol, or may be configured by a network side device. The first configuration parameter may be used to indicate at least one of M cells and N DRX groups that are indicated by a PS-PDCCH configured in one cell group, the M cells may include a part of or all of cells in the cell group, and the N DRX groups may include a part of or all of DRX groups configured in the cell group.

For example, the protocol predefines or the network side device configures that a PS-PDCCH configured in one cell group can indicate all DRX groups or all cells configured in the cell group, or the protocol predefines or the network side device configures that a PS-PDCCH configured in one cell group can indicate a primary DRX group or a PCell configured in the cell group, where the primary DRX group may be a DRX group to which the PCell belongs; or the protocol predefines or the network side device configures that a PS-PDCCH configured in one cell group can indicate a secondary DRX group or a SCell configured in the cell group, where the secondary DRX group may be one or more DRX groups that do not include the PCell.

It should be noted that the PS-PDCCH indicates a cell or a DRX group. It can be understood that in a case that a wake-up indication field is configured in DCI (for example, DCI format 2_6) of the PS-PDCCH, the wake-up indication field indicates whether a drx-ondurationtimer in a DRX cycle in which the cell or the DRX group is after the wake-up indicator field is enabled; or in a case that a secondary cell dormancy indication field is configured in DCI of the PS-PDCCH, whether a secondary group to which the cell belongs or a secondary group formed by a cell corresponding to the DRX group is dormant is indicated by using the secondary cell dormancy indication field.

Optionally, in this embodiment, in a case that one or more DRX groups are configured in one cell group, a first configuration parameter that is used to indicate an object that can be indicated by a PS-PDCCH configured in the cell group may be obtained.

Optionally, in this embodiment, if the object that can be indicated by the PS-PDCCH includes a DRX group, the first configuration parameter that is used to indicate the object that can be indicated by the PS-PDCCH configured in the cell group may be obtained in a case that a plurality of DRX groups are configured in the cell group; or if the object that can be indicated by the PS-PDCCH includes only a cell, the first configuration parameter that is used to indicate the object that can be indicated by the PS-PDCCH configured in the cell group may be obtained in a case that one or more DRX groups are configured in the cell group.

In some embodiments, after obtaining the first configuration parameter, the terminal device may receive the PS-PDCCH, and indicate at least one of the N DRX groups and the M cells based on the received PS-PDCCH. It should be noted that a DRX group other than the N DRX groups or a cell other than the M cells in the cell group may follow a processing behavior when the PS-PDCCH is not configured.

According to the PS-PDCCH configuration method provided in this embodiment of the present disclosure, a first configuration parameter indicates at least one of N DRX groups and M cells that can be indicated by a PS-PDCCH. In this way, a manner of configuring an indication range of a PS-PDCCH in a case that one or more DRX groups are configured in one cell group, thereby improving flexibility of indicating at least one of a DRX group and a cell based on the PS-PDCCH.

Optionally, a value range of N may be [1, K], and K is the number of DRX groups configured in a cell group corresponding to the PS-PDCCH;

and/or a value range of M may be [1, L], and L is the number of cells configured in the cell group corresponding to the PS-PDCCH.

The cell group corresponding to the PS-PDCCH means that a cell group of the PS-PDCCH is configured.

In this embodiment, it may be configured that a PS-PDCCH configured in one cell group can indicate any number of cells in the cell group, or any number of DRX groups configured in the cell group, or any number of cells and any number of DRX groups in the cell group. Therefore, flexibility of executing indication based on the PS-PDCCH is relatively high, thereby implementing power saving.

Optionally, the first configuration parameter may include at least one of the following:

an identifier of each of the N DRX groups;

an identifier of each of the M cells; and an identifier of a cell group corresponding to the N DRX groups or the M cells.

In this embodiment, the first configuration parameter may include at least one of an identifier of a cell that can be indicated by the PS-PDCCH, an identifier of a DRX group, or an identifier of a cell group corresponding to a supported cell or DRX group. For example, the first configuration parameter may include a DRX group ID list and/or a cell ID list, the DRX group ID list includes IDs of the N DRX groups, and the cell ID list includes IDs of the M cells.

Optionally, in a case that the PS-PDCCH can indicate all cells in the cell group, the first configuration parameter may include only an identifier of the cell group.

It should be noted that an ID of a cell in one cell group or an ID of a DRX group configured in one cell group may be properly set according to an actual situation. For example, an ID of a DRX group that is corresponding to a cell in a cell group and includes a PCell may be 0, an ID of a PCell may be 0, and IDs of other DRX groups and/or IDs of other cells in the cell group may be successively set in ascending order of IDs.

In this embodiment, the first configuration parameter is used to explicitly indicate at least one of an identifier of a cell that can be indicated by the PS-PDCCH, an identifier of a DRX group, and an identifier of a cell group corresponding to a supported cell or DRX group, so that the terminal device quickly determines at least one of ae cell and a DRX group that can be indicated by the PS-PDCCH.

Optionally, the object includes the N DRX groups and the M cells, and a DRX group to which the M cells belong is included in the N DRX groups.

In this embodiment, in a case that it is configured that the PS-PDCCH can indicate the N DRX groups and the M cells, the terminal device may expect that the DRX group to which the M cells belong is included in the N DRX groups. In this way, a conflict can be avoided when the PS-PDCCH indicates the N DRX groups and the M cells.

Optionally, in a case that the PS-PDCCH can indicate the N DRX groups and the M cells, the PS-PDCCH may be configured to indicate an intersection set between cells corresponding to the N DRX groups and the M cells, to avoid a conflict.

Optionally, in a case that the object includes the N DRX groups and the M cells, the PS-PDCCH is configured to indicate the N DRX groups or the M cells.

In this embodiment, in a case that it is configured that the PS-PDCCH can indicate the N DRX groups and the M cells, to avoid a conflict, the PS-PDCCH may indicate only the N DRX groups or the M cells in a specific indication process, that is, the PS-PDCCH indicates only one granularity of a DRX group and a cell in the specific indication process.

Optionally, in a case that a wake-up indication field is configured in downlink control information DCI of the PS-PDCCH, the N DRX groups or the M cells are all indicated by using a same bit in the wake-up indication field; or in a case that a wake-up indication field is configured in DCI of the PS-PDCCH, different DRX groups in the N DRX groups or different cells in the M cells are respectively indicated by using different bits in the wake-up indication field.

In an implementation, in a case that the wake-up indication field is configured in the DCI of the PS-PDCCH, the same bit in the wake-up indication field may be used to indicate whether to enable a drx-ondurationtimer in a next DRX cycle of the N DRX groups or the M cells. That is, different DRX groups or different cells are indicated (jointly indicated) by using the same bit in the wake-up indication field. This indication manner is relatively simple to implement.

For example, the N DRX groups or the M cells are indicated by using the same bit in the wake-up indication field, or the N DRX groups or the M cells are indicated by using a plurality of same bits (for example, 2 bits) in the wake-up indication field, for example, the N DRX groups or the M cells are indicated by using a first bit and a second bit in the wake-up indication field.

In another implementation, in a case that the wake-up indication field is configured in the DCI of the PS-PDCCH, different bits in the wake-up indication field may respectively indicate whether to enable a drx-ondurationtimer in a next DRX cycle of different DRX groups in the N DRX groups or a drx-ondurationtimer in a next DRX cycle of different cells in the M cells. That is, different DRX groups or different cells are indicated (separately indicated) by using different bits in the wake-up indication field. This indication manner is relatively flexible.

In some embodiments, if the wake-up indication field is configured to separately indicate each of the N DRX groups or each of the M cells, one wake-up indication bit corresponding to each DRX group or each cell may be configured, and the N DRX groups or the M cells separately follow an indication of a respective wake-up indication bit.

Optionally, in a case that different DRX groups in the N DRX groups or different cells in the M cells are respectively indicated by using different bits in the wake-up indication field, a secondary cell dormancy indication field is not configured in the DCI of the PS-PDCCH.

In this embodiment, in a case that different DRX groups in the N DRX groups or different cells in the M cells are respectively indicated by using different bits in the wake-up indication field, the terminal device may expect that a SCell dormancy indication field is not configured in the DCI of the PS-PDCCH, to reduce resource overheads.

Optionally, in a case that a secondary cell dormancy indication field is configured in DCI of the PS-PDCCH, a secondary cell group SCell group is obtained in a first grouping manner or a second grouping manner, where the first grouping manner is separately executing SCell grouping in each of the N DRX groups to obtain the SCell group, and the second grouping manner is uniformly executing SCell grouping in the N DRX groups to obtain the SCell group.

In an implementation, in a case that the secondary cell dormancy indication field is configured in the DCI of the PS-PDCCH, SCell grouping is separately executed in each of the N DRX groups to obtain the SCell group, that is, SCells in each SCell group are from a same DRX group. In this way, a problem that different DRX-related timer configurations in one SCell group caused by SCell grouping across DRX groups result in non-synchronization of a start time and an end time of monitoring a PDCCH can be avoided. In addition, because FRs of SCells in one DRX group are the same, it is more suitable to place the SCells in one DRX group for a uniform indication. For example, if a PS-PDCCH configured in one cell group can indicate a DRX group 1 and a DRX group 2 configured in the cell group, SCells corresponding to the DRX group 1 may be grouped into a SCell group, and SCells corresponding to the DRX group 2 may be grouped into a SCell group.

In another implementation, in a case that the secondary cell dormancy indication field is configured in the DCI of the PS-PDCCH, SCell grouping is uniformly executed in the N DRX groups to obtain the SCell group, that is, SCells in one SCell group are SCells corresponding to different DRX groups. In this way, a protocol change due to introduction of a plurality of DRX groups can be reduced. For example, if a PS-PDCCH configured in one cell group can indicate a DRX group 1 and a DRX group 2 configured in the cell group, SCells corresponding to the DRX group 1 and SCells corresponding to the DRX group 2 may be uniformly grouped into a SCell group.

It should be noted that, different formed SCell groups may be indicated by using different indication bits in the secondary cell dormancy indication field.

Optionally, in a case that a wake-up indication field and a secondary cell dormancy indication field are configured in DCI of the PS-PDCCH, and different DRX groups in the N DRX groups are respectively indicated by using different bits in the wake-up indication field, a SCell group is obtained in a third grouping manner, where the third grouping manner is separately executing SCell grouping in each of the N DRX groups to obtain the SCell group.

In this embodiment, in a case that both the wake-up indication field and the secondary cell dormancy indication field are configured in the DCI of the PS-PDCCH, if different DRX groups in the N DRX groups are respectively indicated by using different bits in the wake-up indication field, SCell grouping is separately executed in each of the N DRX groups to obtain the SCell group, that is, the SCell group can be formed only in a DRX group, and SCells in each SCell group are from a same DRX group. In this way, a problem that dormancy behaviors of SCells in one SCell group are different because indications of wake-up indication fields of different DRX groups are inconsistent can be avoided. Otherwise, SCell grouping may be separately executed in each of the N DRX groups to obtain the SCell group, or SCell grouping may be uniformly executed in the N DRX groups to obtain the SCell group.

Optionally, if the wake-up indication field is not configured but the secondary cell dormancy indication field is configured in the DCI of the PS-PDCCH, a drx-ondurationtimer in each DRX cycle of the N DRX groups or the M Cells may be enabled, and a dormancy or non-dormancy behavior may be separately executed according to an indication for each SCell group in the secondary cell dormancy indication field.

Optionally, if the wake-up indication field and the secondary cell dormancy indication field are configured in the DCI of the PS-PDCCH, it may be determined, according to an indication of the wake-up indication field, whether to enable a drx-ondurationtimer in a next DRX cycle, where the secondary cell dormancy indication field is valid only for a SCell group in a DRX group in which the wake indication field instructs to enable the drx-ondurationtimer.

Optionally, the first configuration parameter further includes a first indication parameter, the first indication parameter is used to instruct the terminal device to execute a first processing behavior, and the first processing behavior includes one of the following:

enabling a DRX On duration timer drx-ondurationtimer in a next DRX cycle of each of the N DRX groups;

determining, according to an indication of the PS-PDCCH, whether to enable a drx-ondurationtimer in a next DRX cycle of each of the N DRX groups;

determining, according to an indication of the PS-PDCCH for a first DRX group, whether to enable a drx-ondurationtimer in a next DRX cycle of the first DRX group and enable a drx-ondurationtimer in a next DRX cycle of a second DRX group;

enabling a drx-ondurationtimer in a next DRX cycle of a first DRX group, and determining, according to an indication of the PS-PDCCH for a second DRX group, whether to enable a drx-ondurationtimer in a next DRX cycle of the second DRX group; and enabling a drx-ondurationtimer in a next DRX cycle of a third DRX group, and determining, according to an indication of the PS-PDCCH for a fourth DRX group, whether to enable a drx-ondurationtimer in a next DRX cycle of the fourth DRX group, where the first DRX group is a DRX group to which a PCell belongs in the N DRX groups, the second DRX group is a DRX group other than the first DRX group in the N DRX groups, the third DRX group is a DRX group whose running time of a DRX inactivity timer drx-inactivitytimer covers a monitoring occasion MO of the PS-PDCCH in the N DRX groups, and the fourth DRX group is a DRX group other than the third DRX group in the N DRX groups.

Optionally, the first indication parameter is used to instruct the terminal device to execute the first processing behavior in a first case or a second case, where the first case is that a running time of a drx-inactivitytimer of a DRX group to which a first cell belongs covers the MO of the PS-PDCCH, and the first cell is any secondary cell SCell in a cell group corresponding to the PS-PDCCH; and the second case is that a running time of a drx-inactivitytimer of a DRX group to which a second cell belongs covers the MO of the PS-PDCCH, and the second cell is a primary cell in the cell group corresponding to the PS-PDCCH.

Figure 7:
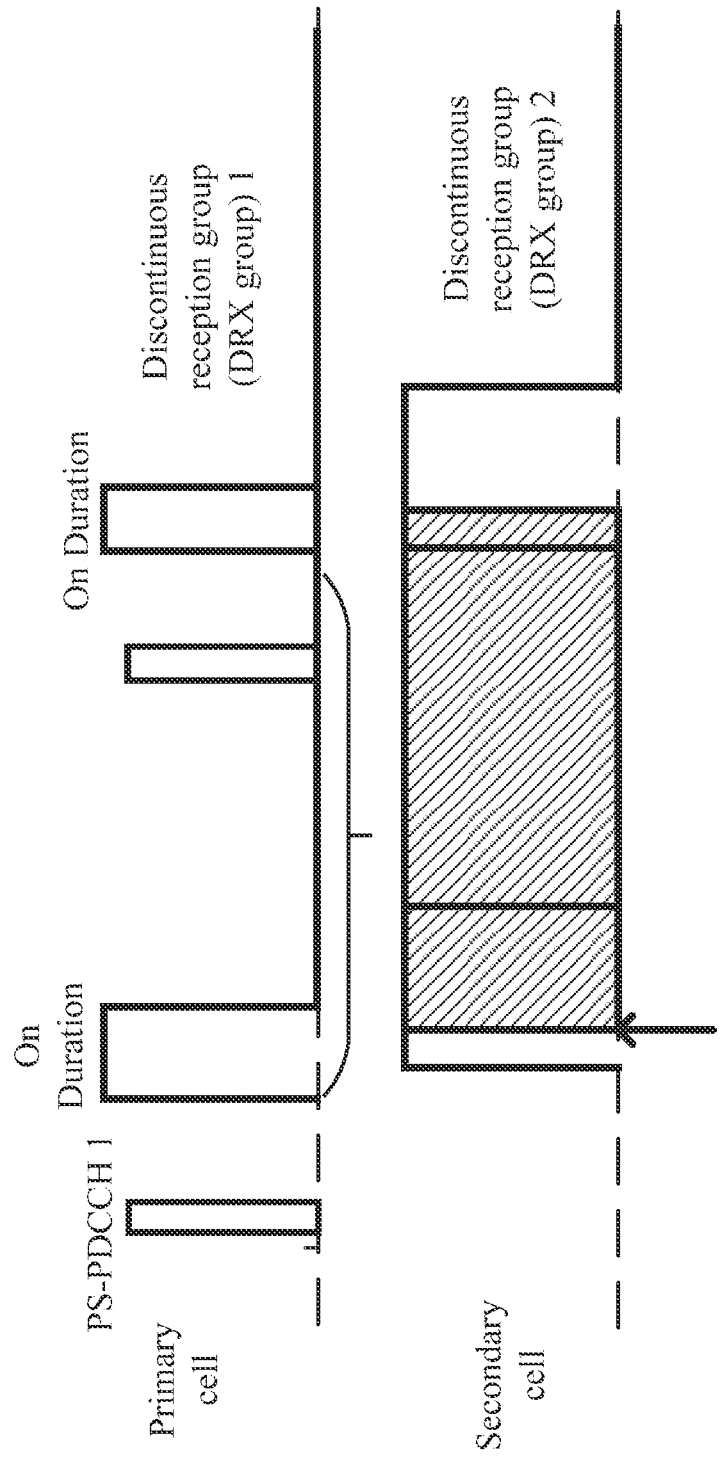
FIG. 7 is a schematic diagram in which a running time of a drx-inactivitytimer of a DRX group to which a non-PCell belongs covers an MO of a PS-PDCCH according to an embodiment of the present disclosure.
Figure 8:
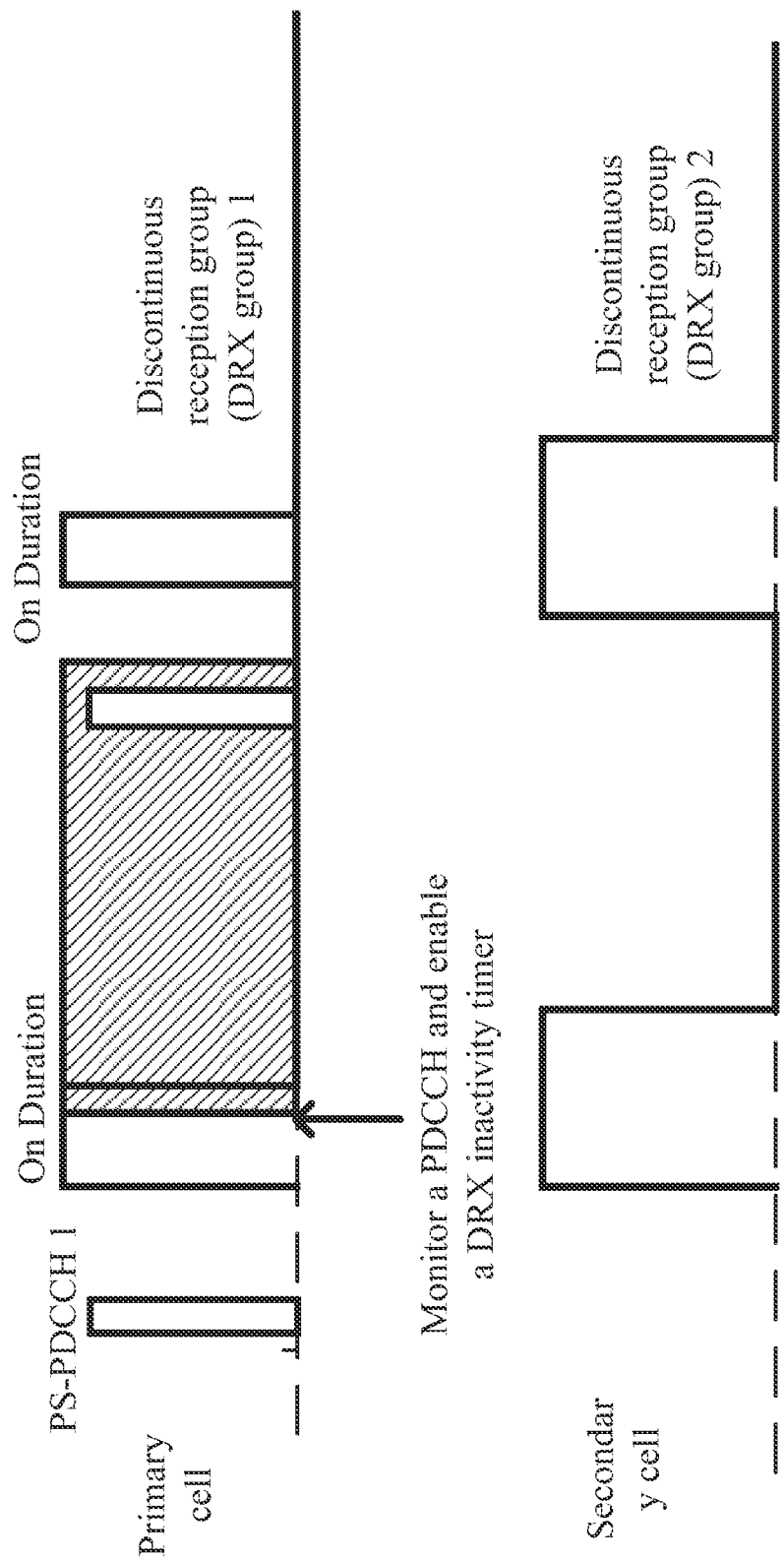
FIG. 8 is a schematic diagram in which a running time of a drx-inactivitytimer of a DRX group to which a PCell belongs covers an MO of a PS-PDCCH according to an embodiment of the present disclosure.

In this embodiment, in a case that the running time of the drx-inactivitytimer of the DRX group to which the first cell (that is, a non-PCell) belongs covers the MO of the PS-PDCCH, as shown in FIG. 7, or in a case that the running time of the drx-inactivitytimer of the DRX group to which the second cell (that is, a PCell) belongs covers the MO of the PS-PDCCH, as shown in FIG. 8, the terminal device may execute any one of the following processing behaviors:

Processing behavior 1: Enable the drx-ondurationtimer in the next DRX cycle of each of the N DRX groups, to reduce a delay of data transmission.

Processing behavior 2: Still determine, according to the indication of the PS-PDCCH, whether to enable the drx-ondurationtimer in the next DRX cycle of each of the N DRX groups, to save power while reducing the delay of data transmission.

Processing behavior 3: Determine, according to the indication of the PS-PDCCH for the first DRX group, whether to enable the drx-ondurationtimer in the next DRX cycle of the first DRX group, and enable the drx-ondurationtimer in the next DRX cycle of the second DRX group, to reduce a delay of SCell data transmission while reducing power of PCell data transmission.

Processing behavior 4: Enable the drx-ondurationtimer in the next DRX cycle of the first DRX group, and determine, according to the indication of the PS-PDCCH for the second DRX group, whether to enable the drx-ondurationtimer in the next DRX cycle of the second DRX group, to reduce a delay of PCell data transmission while reducing power of SCell data transmission.

Processing behavior 5: Enable the drx-ondurationtimer in the next DRX cycle of the third DRX group, and determine, according to the indication of the PS-PDCCH for the fourth DRX group, whether to enable the drx-ondurationtimer in the next DRX cycle of the fourth DRX group, to reduce power of data transmission of other cell corresponding to another DRX group while reducing a delay of data transmission of a cell corresponding to a DRX group that covers the MO of the PS-PDCCH.

Optionally, in a case that the running time of the inactivitytimer of the DRX group to which the PCell belongs covers the MO of the PS-PDCCH, the terminal device may also enable the drx-ondurationtimer in the next DRX cycle of each of the N DRX groups, to reduce a delay of data transmission.

It should be noted that the PS-PDCCH may be configured in a PCell of the cell group.

Optionally, the obtaining a first configuration parameter may include one of the following:

receiving the first configuration parameter by using radio resource control RRC signaling;

determining the first configuration parameter from I groups of configuration parameters according to received downlink control information DCI signaling or a Media Access Control control element MAC CE, where I is an integer greater than 1; and determining the first configuration parameter from J groups of configuration parameters according to received DCI signaling, where the J groups of configuration parameters are configured by using RRC signaling and activated by using a Media Access Control control element MAC CE, and J is an integer greater than 1.

In an implementation, the network side device may configure only one group of configuration parameters, that is, the first configuration parameter, for the terminal device by using RRC signaling, so that the terminal device can receive the first configuration parameter from the network side device by using RRC signaling, and can learn, based on the first configuration parameter, at least one of the N DRX groups and the M cells that can be indicted by the PS-PDCCH. This parameter configuration manner is easy to implement.

In another implementation, the network side device may configure I groups of configuration parameters for the terminal device by using RRC signaling, and activate one of the I groups of configuration parameters by using DCI signaling or a MAC CE. In this way, the terminal device may learn, based on one group of configuration parameters (that is, the first configuration parameter) activated by the DCI signaling or the MAC CE, at least one of the N DRX groups and the M cells that can be indicated by the PS-PDCCH. This parameter configuration manner is relatively flexible, thereby improving flexibility of an indication of the PS-PDCCH.

In another implementation, the network side device may configure I groups of configuration parameters for the terminal device by using RRC signaling, activate J of the I groups of configuration parameters by using a MAC CE, and indicate one of the activated J groups of configuration parameter based on DCI signaling. The DCI may be a DCI format 2_6, or a scheduled DCI format 1_1 or 0_1, or the like. In this way, the terminal device may learn, based on one group of configuration parameters (that is, the first configuration parameter) indicated by the DCI signaling, at least one of the N DRX groups and the M cells that can be indicated by the PS-PDCCH. This parameter configuration manner is relatively flexible, thereby improving flexibility of an indication of the PS-PDCCH.

Figure 9:
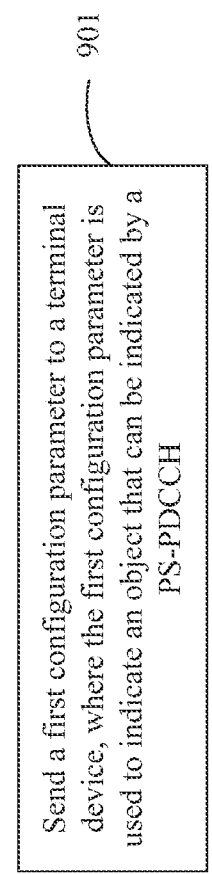
FIG. 9 is a schematic flowchart of another PS-PDCCH configuration method according to an embodiment of the present disclosure.

An embodiment of the present disclosure provides a PS-PDCCH configuration method, applied to a network side device. Referring to FIG. 9, FIG. 9 is a flowchart of another PS-PDCCH configuration method according to an embodiment of the present disclosure. As shown in FIG. 9, the method includes the following steps.

Step 901: Send a first configuration parameter to a terminal device, where the first configuration parameter is used to indicate an object that can be indicated by a PS-PDCCH, the object includes at least one of N DRX groups and M cells, and both N and M are positive integers.

In this embodiment, the first configuration parameter may be used to indicate at least one of M cells and N DRX groups that are indicated by a PS-PDCCH configured in one cell group, the M cells may include a part of or all of cells in the cell group, and the N DRX groups may include a part of or all of DRX groups configured in the cell group.

For example, the network side device may configure that a PS-PDCCH configured in one cell group can indicate all DRX groups or all cells configured in the cell group, or the network side device configures that a PS-PDCCH configured in one cell group can indicate a primary DRX group or a PCell configured in the cell group, where the primary DRX group may be a DRX group to which the PCell belongs; or the network side device configures that a PS-PDCCH configured in one cell group can indicate a secondary DRX group or a SCell configured in the cell group, where the secondary DRX group may be one or more DRX groups other than the DRX group to which the PCell belongs.

Optionally, in this embodiment, in a case that one or more DRX groups are configured in one cell group, a first configuration parameter that is used to indicate an object that can be indicated by a PS-PDCCH configured in the cell group may be obtained.

Optionally, in this embodiment, if the object that can be indicated by the PS-PDCCH includes a DRX group, the first configuration parameter that is used to indicate the object that can be indicated by the PS-PDCCH configured in the cell group may be obtained in a case that a plurality of DRX groups are configured in the cell group; or if the object that can be indicated by the PS-PDCCH includes only a cell, the first configuration parameter that is used to indicate the object that can be indicated by the PS-PDCCH configured in the cell group may be obtained in a case that one or more DRX groups are configured in the cell group.

According to the PS-PDCCH configuration method provided in this embodiment of the present disclosure, a first configuration parameter is sent to a terminal device to indicate at least one of N DRX groups and M cells that can be indicated by a PS-PDCCH. In this way, a manner of configuring an indication range of a PS-PDCCH in a case that one or more DRX groups are configured in one cell group, thereby improving flexibility of indicating at least one of a DRX group and a cell based on the PS-PDCCH.

Optionally, a value range of N may be [1, K], and K is the number of DRX groups configured in a cell group corresponding to the PS-PDCCH;
and/or
a value range of M may be [1, L], and L is the number of cells configured in the cell group corresponding to the PS-PDCCH.

In this embodiment, it may be configured that a PS-PDCCH configured in one cell group can indicate any number of cells in the cell group, or any number of DRX groups configured in the cell group, or any number of cells and any number of DRX groups in the cell group. Therefore, flexibility of executing indication based on the PS-PDCCH is relatively high, thereby implementing power saving.

Optionally, the first configuration parameter may include at least one of the following:
an identifier of each of the N DRX groups;
an identifier of each of the M cells; and
an identifier of a cell group corresponding to the N DRX groups or the M cells.

In this embodiment, the first configuration parameter is used to explicitly indicate at least one of an identifier of a cell that can be indicated by the PS-PDCCH, an identifier of a DRX group, and an identifier of a cell group corresponding to a supported cell or DRX group, so that the terminal device quickly determines at least one of a cell and a DRX group that can be indicated by the PS-PDCCH.

Optionally, the object includes the N DRX groups and the M cells, and a DRX group to which the M cells belong is included in the N DRX groups.

In this embodiment, in a case that the PS-PDCCH can indicate the N DRX groups and the M cells, the network side device may configure that the DRX group to which the M cells belong is included in the N DRX groups. In this way, a conflict can be avoided when the PS-PDCCH indicates the N DRX groups and the M cells.

Optionally, in a case that the PS-PDCCH can indicate the N DRX groups and the M cells, the network side device may configure that the PS-PDCCH indicates an intersection set between cells corresponding to the N DRX groups and the M cells, to avoid a conflict.

Optionally, in a case that the object includes the N DRX groups and the M cells, the PS-PDCCH is configured to indicate the N DRX groups or the M cells.

In this embodiment, in a case that it is configured that the PS-PDCCH can indicate the N DRX groups and the M cells, to avoid a conflict, the network side device may configure that the PS-PDCCH may indicate only the N DRX groups or the M cells in a specific indication process, that is, the PS-PDCCH indicates only one granularity of a DRX group and a cell in the specific indication process.

Optionally, in a case that a wake-up indication field is configured in downlink control information DCI of the PS-PDCCH, the N DRX groups or the M cells are all indicated by using a same bit in the wake-up indication field; or in a case that a wake-up indication field is configured in DCI of the PS-PDCCH, different DRX groups in the N DRX groups or different cells in the M cells are respectively indicated by using different bits in the wake-up indication field.

In an implementation, in a case that the wake-up indication field is configured in the DCI of the PS-PDCCH, a same bit in the wake-up indication field may be used to indicate whether to enable a drx-ondurationtimer in a next DRX cycle of the N DRX groups or the M cells. That is, different DRX groups or different cells are indicated (jointly indicated) by using the same bit in the wake-up indication field. This indication manner is relatively simple to implement.

In another implementation, in a case that the wake-up indication field is configured in the DCI of the PS-PDCCH, different bits in the wake-up indication field may respectively indicate whether to enable a drx-ondurationtimer in a next DRX cycle of different DRX groups in the N DRX groups or a drx-ondurationtimer in a next DRX cycle of different cells in the M cells. That is, different DRX groups or different cells are indicated (separately indicated) by using different bits in the wake-up indication field. This indication manner is relatively flexible.

Optionally, in a case that different DRX groups in the N DRX groups or different cells in the M cells are respectively indicated by using different bits in the wake-up indication field, a secondary cell dormancy indication field is not configured in the DCI of the PS-PDCCH.

In this embodiment, in a case that different DRX groups in the N DRX groups or different cells in the M cells are respectively indicated by using different bits in the wake-up indication field, the network side device may not configure a secondary cell dormancy indication field in the DCI of the PS-PDCCH, to reduce resource overheads.

Optionally, in a case that a secondary cell dormancy indication field is configured in DCI of the PS-PDCCH, a secondary cell group SCell group is obtained in a first grouping manner or a second grouping manner, where
the first grouping manner is separately executing SCell grouping in each of the N DRX groups to obtain the SCell group, and the second grouping manner is uniformly executing SCell grouping in the N DRX groups to obtain the SCell group.

In an implementation, in a case that the secondary cell dormancy indication field is configured in the DCI of the PS-PDCCH, SCell grouping is separately executed in each of the N DRX groups to obtain the SCell group, that is, SCells in each SCell group are SCells corresponding to a same DRX group. For example, if a PS-PDCCH configured in one cell group can indicate a DRX group 1 and a DRX group 2 configured in the cell group, SCells corresponding to the DRX group 1 may be grouped into a SCell group, and SCells corresponding to the DRX group 2 may be grouped into a SCell group.

In another implementation, in a case that the secondary cell dormancy indication field is configured in the DCI of the PS-PDCCH, SCell grouping is uniformly executed in the N DRX groups to obtain the SCell group, that is, SCells in one SCell group are SCells corresponding to different DRX groups. For example, if a PS-PDCCH configured in one cell group can indicate a DRX group 1 and a DRX group 2 configured in the cell group, SCells corresponding to the DRX group 1 and SCells corresponding to the DRX group 2 may be uniformly grouped into a SCell group.

Optionally, in a case that a wake-up indication field and a secondary cell dormancy indication field are configured in DCI of the PS-PDCCH, and different DRX groups in the N DRX groups are respectively indicated by using different bits in the wake-up indication field, a SCell group is obtained in a third grouping manner, where
the third grouping manner is separately executing SCell grouping in each of the N DRX groups to obtain the SCell group.

In this embodiment, in a case that both the wake-up indication field and the secondary cell dormancy indication field are configured in the DCI of the PS-PDCCH, if different DRX groups in the N DRX groups are respectively indicated by using different bits in the wake-up indication field, SCell grouping is separately executed in each of the N DRX groups to obtain the SCell group, that is, the SCell group can be formed only in a DRX group, and SCells in each SCell group are SCells corresponding to a same DRX group; otherwise, SCell grouping may be separately executed in each of the N DRX groups to obtain the SCell group, or SCell grouping may be uniformly executed in the N DRX groups to obtain the SCell group.

Optionally, the first configuration parameter further includes a first indication parameter, the first indication parameter is used to instruct the terminal device to execute a first processing behavior, and the first processing behavior includes one of the following:
enabling a DRX On duration timer drx-ondurationtimer in a next DRX cycle of each of the N DRX groups;
determining, according to an indication of the PS-PDCCH, whether to enable a drx-ondurationtimer in a next DRX cycle of each of the N DRX groups;
determining, according to an indication of the PS-PDCCH for a first DRX group, whether to enable a drx-ondurationtimer in a next DRX cycle of the first DRX group and enable a drx-ondurationtimer in a next DRX cycle of a second DRX group;
enabling a drx-ondurationtimer in a next DRX cycle of a first DRX group, and determining, according to an indication of the PS-PDCCH for a second DRX group, whether to enable a drx-ondurationtimer in a next DRX cycle of the second DRX group; and
enabling a drx-ondurationtimer in a next DRX cycle of a third DRX group, and determining, according to an indication of the PS-PDCCH for a fourth DRX group, whether to enable a drx-ondurationtimer in a next DRX cycle of the fourth DRX group, where
the first DRX group is a DRX group to which a primary cell PCell belongs in the N DRX groups, the second DRX group is a DRX group other than the first DRX group in the N DRX groups, the third DRX group is a DRX group whose running time of a DRX inactivity timer drx-inactivitytimer covers a monitoring occasion MO of the PS-PDCCH in the N DRX groups, and the fourth DRX group is a DRX group other than the third DRX group in the N DRX groups.

Optionally, the first indication parameter is used to instruct the terminal device to execute the first processing behavior in a first case or a second case, where
the first case is that a running time of a drx-inactivitytimer of a DRX group to which a first cell belongs covers the MO of the PS-PDCCH, and the first cell is any secondary cell SCell in a cell group corresponding to the PS-PDCCH; and
the second case is that a running time of a drx-inactivitytimer of a DRX group to which a second cell belongs covers the MO of the PS-PDCCH, and the second cell is a primary cell in the cell group corresponding to the PS-PDCCH.

Optionally, the sending a first configuration parameter to a terminal device may include:

sending the first configuration parameter to the terminal device by using RRC signaling.

In this implementation, the network side device may configure only one group of configuration parameters, that is, the first configuration parameter, for the terminal device by using RRC signaling, so that the terminal device can receive the first configuration parameter from the network side device by using RRC signaling, and can learn, based on the first configuration parameter, at least one of the N DRX groups and the M cells that can be indicted by the PS-PDCCH. This parameter configuration manner is easy to implement.

Optionally, the sending a first configuration parameter to a terminal device includes:

sending I groups of configuration parameters to the terminal device by using RRC signaling, where the I groups of configuration parameters include at least the first configuration parameter, and I is an integer greater than 1; and after the sending a first configuration parameter to a terminal device, the method further includes one of the following:

sending downlink control information DCI signaling to the terminal device, where the DCI signaling is used to determine the first configuration parameter from the I groups of configuration parameters; and sending a Media Access Control control element MAC CE to the terminal device, and sending downlink control information DCI signaling to the terminal device, where the MAC CE is used to instruct to activate J groups of configuration parameters in the I groups of configuration parameters, the DCI signaling is used to determine the first configuration parameter from the J groups of configuration parameters, and J is an integer greater than 1 and less than or equal to I.

In an implementation, the network side device may configure I groups of configuration parameters for the terminal device by using RRC signaling, and activate one of the I groups of configuration parameters by using DCI signaling or a MAC CE. In this way, the terminal device may learn, based on one group of configuration parameters (that is, the first configuration parameter) activated by the DCI signaling or the MAC CE, at least one of the N DRX groups and the M cells that can be indicated by the PS-PDCCH. This parameter configuration manner is relatively flexible, thereby improving flexibility of an indication of the PS-PDCCH.

In another implementation, the network side device may configure I groups of configuration parameters for the terminal device by using RRC signaling, activate J of the I groups of configuration parameters by using a MAC CE, and indicate one of the activated J groups of configuration parameter based on DCI signaling. In this way, the terminal device may learn, based on one group of configuration parameters (that is, the first configuration parameter) indicated by the DCI signaling, at least one of the N DRX groups and the M cells that can be indicated by the PS-PDCCH. This parameter configuration manner is relatively flexible, thereby improving flexibility of an indication of the PS-PDCCH.

The following describes this embodiment of the present disclosure with reference to examples:

Example 1: One PS-PDCCH indicates only a secondary DRX group, and all DRX groups are jointly indicated.

Figure 10:
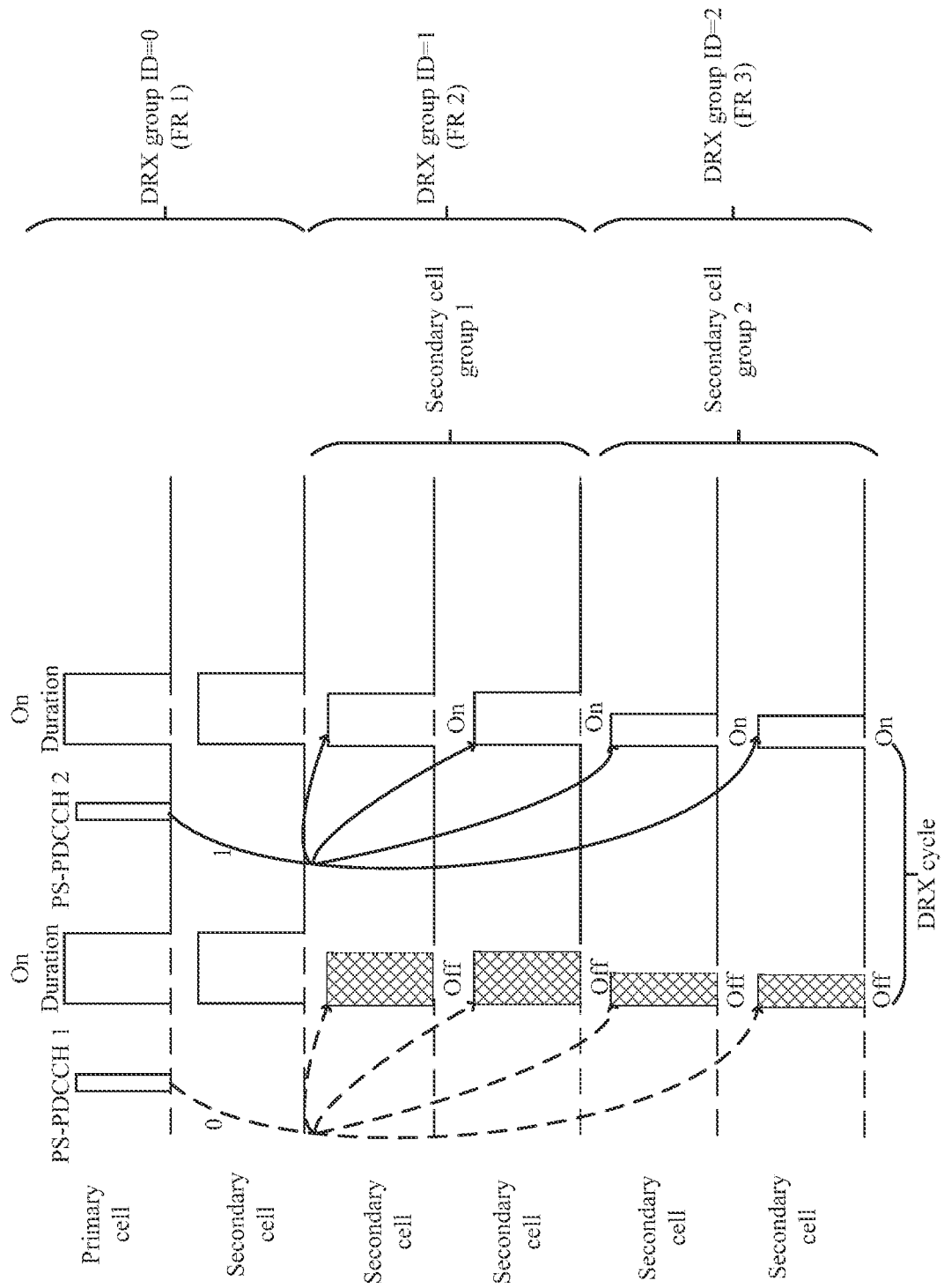
FIG. 10 is a schematic diagram in which a PS-PDCCH indicates a secondary DRX group according to an embodiment of the present disclosure.
Figure 11:
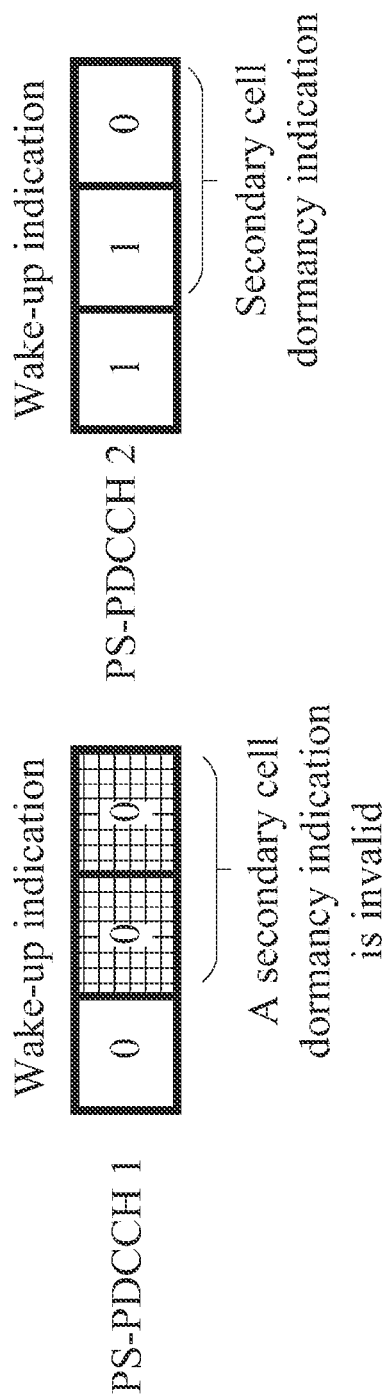
FIG. 11 is a schematic diagram of a wake-up indication field and a SCell dormancy indication field that are configured by a PS-PDCCH according to an embodiment of the present disclosure.

For example, as shown in FIG. 10 and FIG. 11, the network side device configures three DRX groups in one cell group by using RRC, configures one PS-PDCCH in a PCell to jointly indicate DRX groups, and configures a wake-up indication field and a SCell dormancy indication field in DCI 2_6 corresponding to the PS-PDCCH. SCells are grouped according to different DRX groups. Each group of SCells is sub-classified into different SCell groups. In this example, a DRX group 1 forms a secondary cell group 1, and a DRX group 1 forms a secondary cell group 2.

The UE directly obtains a DRX group ID list (the foregoing first configuration parameter) {1,2} by receiving an RRC higher layer signaling parameter, that is, the PS-PDCCH is used for the DRX group 1 and the DRX group 2, where a wake-up indication in a PS-PDCCH 1 indicates that a drx-ondurationtimer in the first DRX cycle of the DRX group 1 and the DRX group 2 is disabled, and a wake-up indication in a PS-PDCCH 2 indicates that a drx-ondurationtimer in the second DRX cycle of the DRX group 1 and the DRX group 2 is enabled. According to a configured SCell group, a SCell dormancy indication 1 in the PS-PDCCH 1 is invalid when the drx-ondurationtimer is disabled, and a SCell dormancy indication2 in the PS-PDCCH2 is valid when the drx-ondurationtimer is enabled.

Example 2: One PS-PDCCH indicates all DRX groups, and DRX groups are separately indicated.

Figure 12:
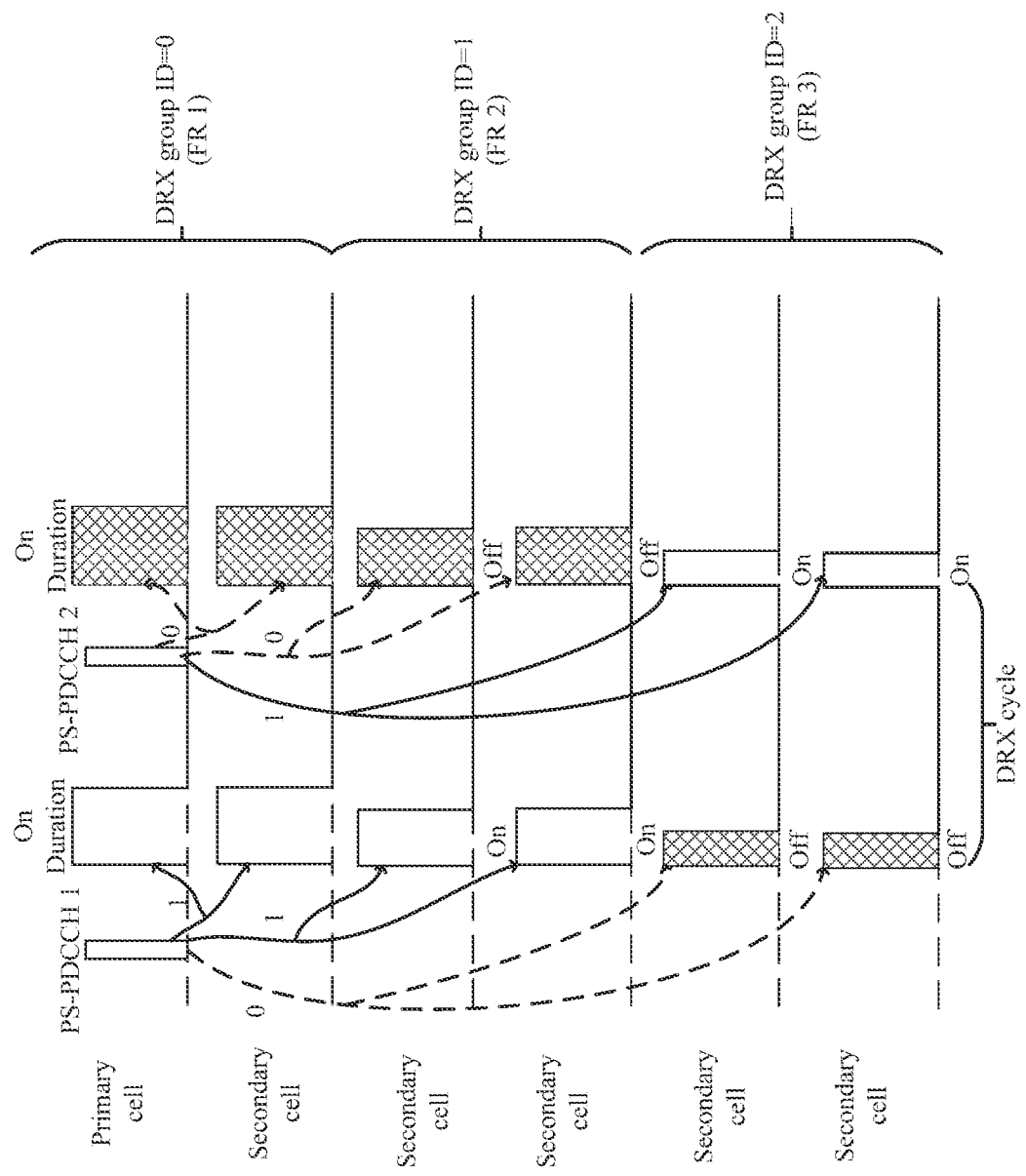
FIG. 12 is a schematic diagram in which a PS-PDCCH indicates all DRX groups according to an embodiment of the present disclosure.
Figure 13:
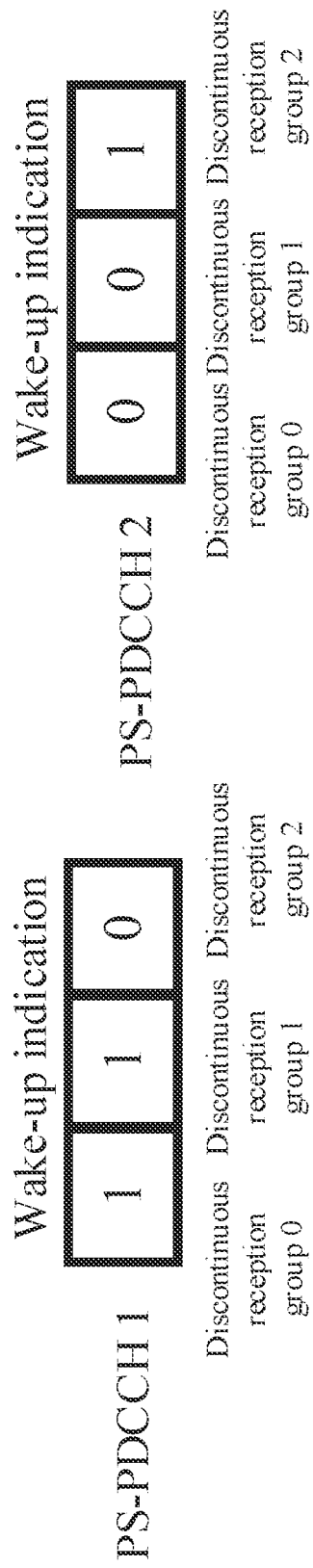
FIG. 13 is a first schematic diagram of a wake-up indication configured by a PS-PDCCH according to an embodiment of the present disclosure.

For example, as shown in FIG. 12 and FIG. 13, the network side device configures three DRX groups in one cell group by using RRC, configures one PS-PDCCH in a PCell to separately indicate DRX groups, and configures a wake-up indication field in DCI 2_6 corresponding to the PS-PDCCH. All possible configuration parameter combinations of an RRC configuration are: { }, {0}, {1}, {2}, {0, 1}, {0, 2}, {1, 2}, and {0,1,2}, a MAC CE is used to activate {0, 1}, {0, 2}, {1, 2}, and {0, 1, 2}, and no more than 2 bits in DCI are dynamically used to indicate a configuration parameter. For example, a DRX group in the DCI is configured to indicate "11", that is, indicates that a configuration {0, 1, 2} is activated.

The UE learns that DRX groups that can be separately indicated by the current PS-PDCCH is a DRX group 0, a DRX group 1, and a DRX group 2, where a wake-up indication in a PS-PDCCH 1 indicates that a drx-ondurationtimer in the first DRX cycle of the DRX group 0 is enabled, indicates that a drx-ondurationtimer in the first DRX cycle of the DRX group 1 is enabled, and indicates that a drx-ondurationtimer in the first DRX cycle of the DRX group 2 is disabled. A wake-up indication in a PS-PDCCH 2 indicates that a drx-ondurationtimer in the second DRX cycle of the DRX group 0 is disabled, indicates that a drx-ondurationtimer in the second DRX cycle of the DRX group 1 is disabled, and indicates that a drx-ondurationtimer in the second DRX cycle of the DRX group 2 is enabled.

Example 3: One PS-PDCCH indicates a part of cells, and the cells are separately indicated.

Figure 14:
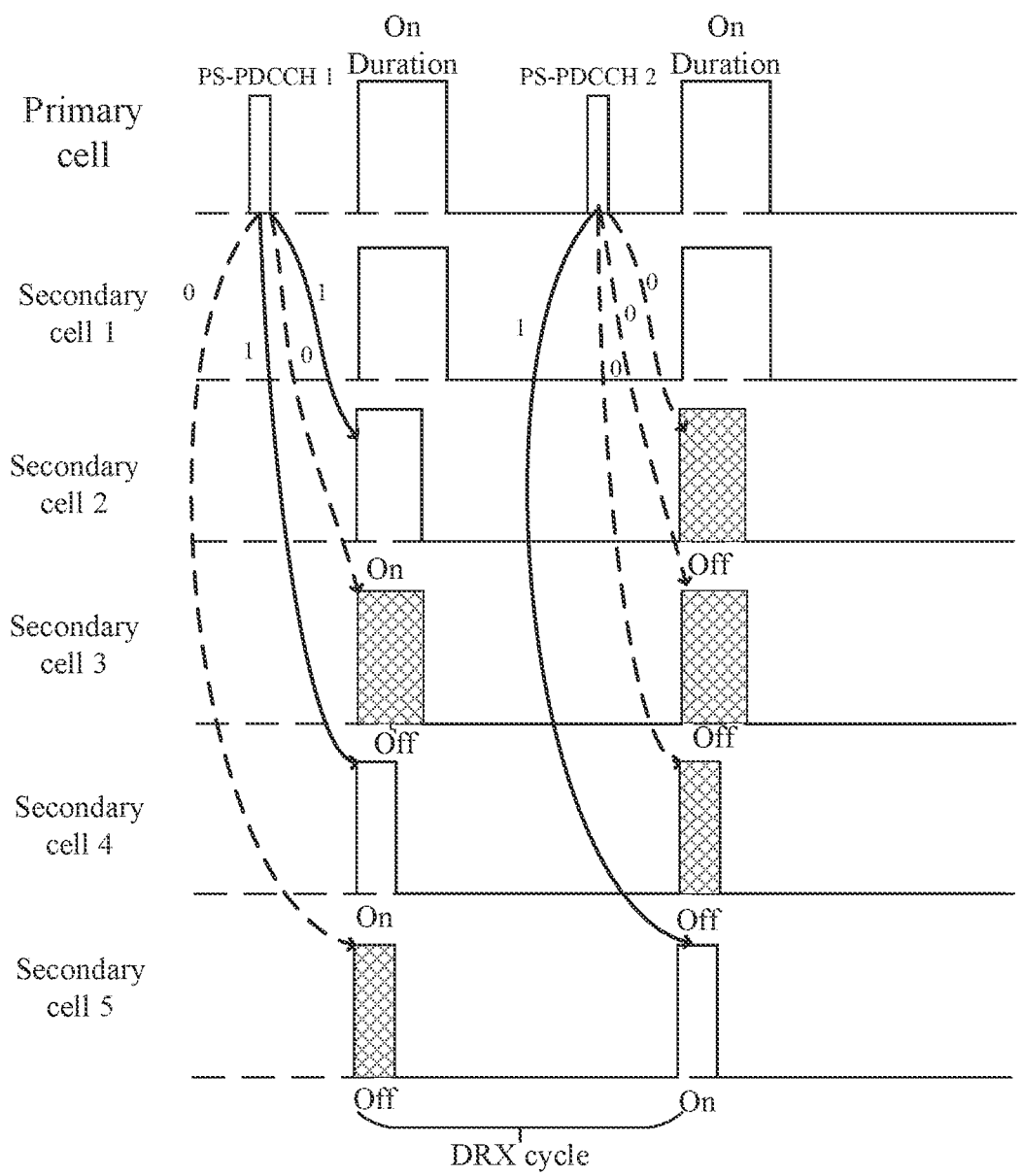
FIG. 14 is a schematic diagram in which a PS-PDCCH indicates a part of cells according to an embodiment of the present disclosure.
Figure 15:
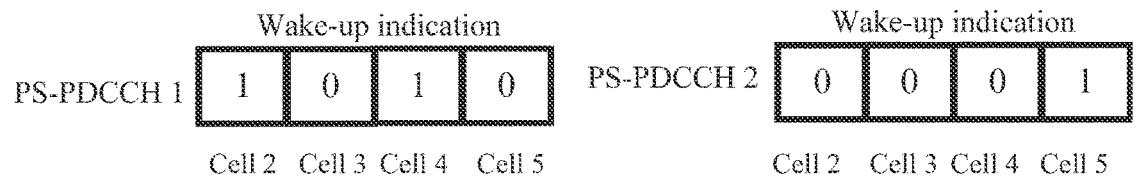
FIG. 15 is a second schematic diagram of a wake-up indication configured by a PS-PDCCH according to an embodiment of the present disclosure.

For example, as shown in FIG. 14 and FIG. 15, the network side device configures six cells and three DRX groups in one cell group by using RRC, configures one PS-PDCCH in a Pell to separately indicate cells, and configures a wake-up indication field in DCI 2_6 corresponding to the PS-PDCCH.

The UE directly obtains a cell ID list {2, 3, 4, 5} by receiving an RRC higher layer signaling parameter, that is, the current PS-PDCCH is independently used for a cell 2, a cell 3, a cell 4, and a cell 5. A wake-up indication in a PS-PDCCH 1 indicates that drx-ondurationtimers in the first DRX cycle of the cell 2, the cell 3, the cell 4, and the cell 5 are enabled, disabled, enabled, and disabled respectively. A wake-up indication in a PS-PDCCH 2 indicates that drx-ondurationtimers in the second DRX cycle of the cell 2, the cell 3, the cell 4, and the cell 5 are disabled, disabled, disabled, and enabled respectively.

Example 4: One PS-PDCCH indicates a part of cells in a part of DRX groups, and DRX groups are separately indicated.

Figure 16:
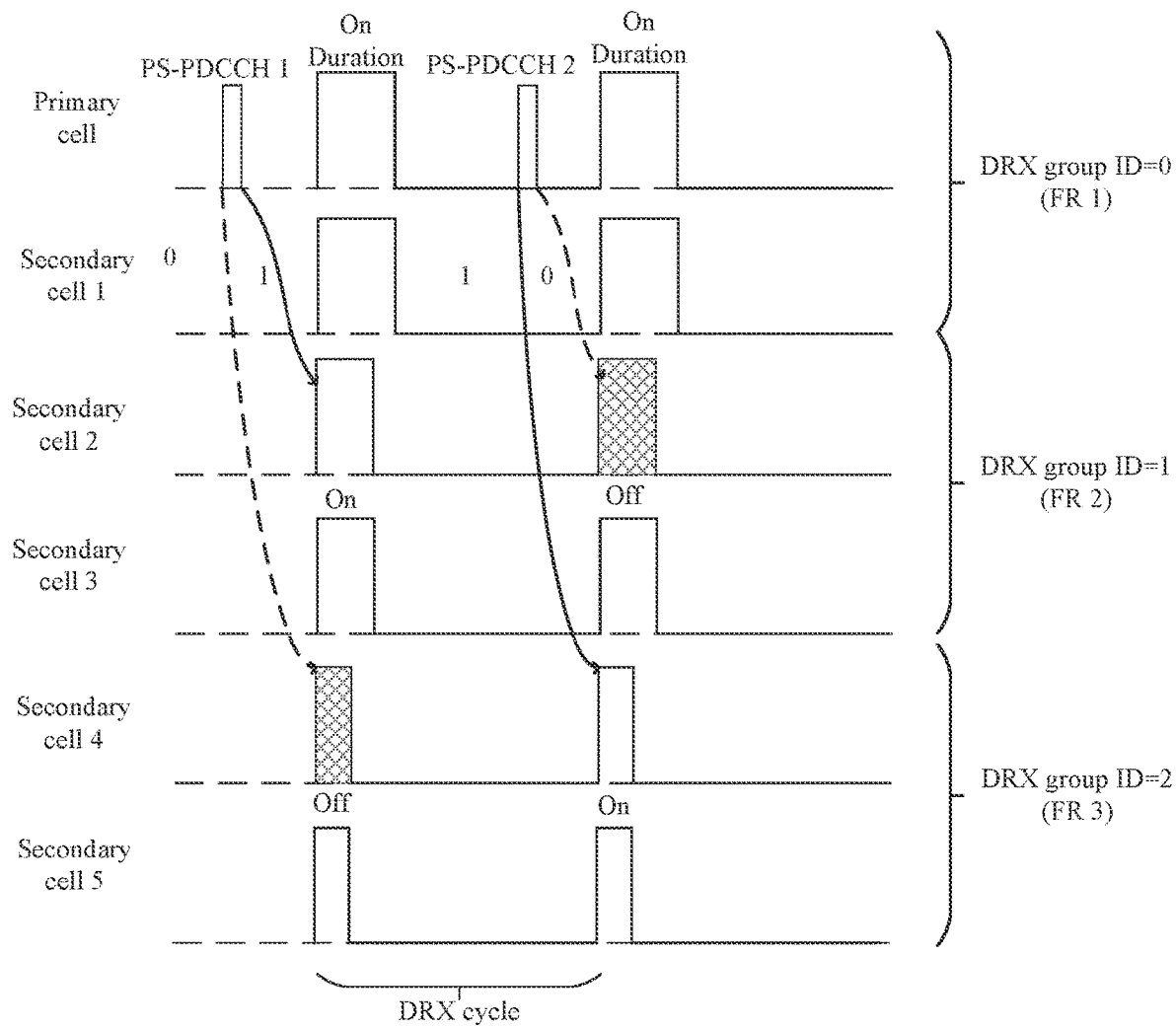
FIG. 16 is a schematic diagram in which a PS-PDCCH indicates a part of cells corresponding to a part of DRX groups according to an embodiment of the present disclosure.
Figure 17:
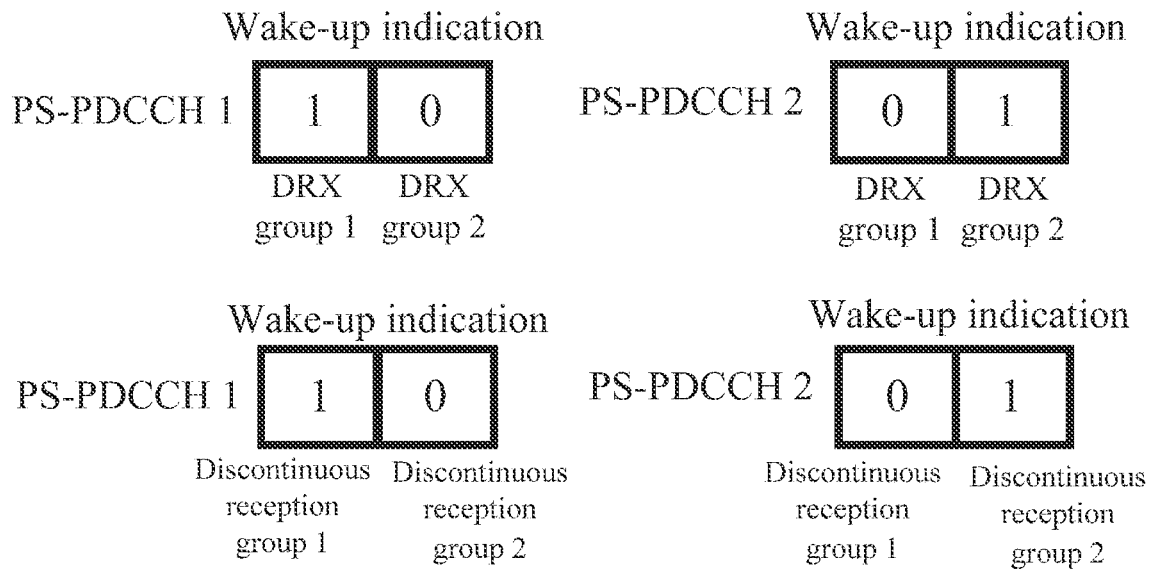
FIG. 17 is a third schematic diagram of a wake-up indication configured by a PS-PDCCH according to an embodiment of the present disclosure.

For example, as shown in FIG. 16 and FIG. 17, the network side device configures six cells and three DRX groups in one cell group by using RRC, configures one PS-PDCCH in a PCell to separately indicate DRX groups, and configures a wake-up indication field in DCI 2_6 corresponding to the PS-PDCCH.

The UE directly obtains a DRX group ID list {1,2} and a cell ID list {2,4} by receiving an RRC higher layer signaling parameter. The UE learns that the current PS-PDCCH is independently used for a cell 2 in a DRX group 1 and a cell 4 in a DRX group 2. A wake-up indication in the PS-PDCCH 1 indicates that a drx-ondurationtimer in the first DRX cycle of the DRX group 1 is enabled, and indicates that a drx-ondurationtimer in the first DRX cycle of the DRX group 2 is disabled. A wake-up indication in the PS-PDCCH 2 indicates that a drx-ondurationtimer in the second DRX cycle of the DRX group 1 is disabled, and indicates that a drx-ondurationtimer in the second DRX cycle of the DRX group 2 is enabled.

Figure 18:
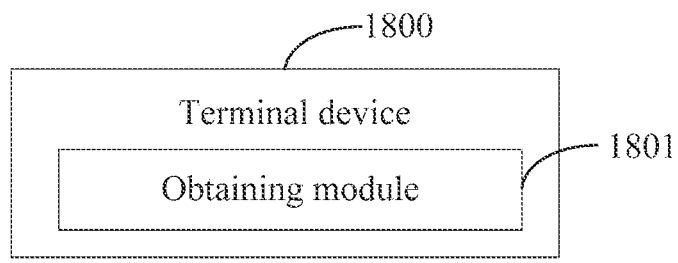
FIG. 18 is a structural diagram of a terminal device according to an embodiment of the present disclosure.

Referring to FIG. 18, FIG. 18 is a structural diagram of a terminal device according to an embodiment of the present disclosure. As shown in FIG. 18, a terminal device 1800 includes:

an obtaining module 1801, configured to obtain a first configuration parameter, where the first configuration parameter is used to indicate an object that can be indicated by a power saving physical downlink control channel PS-PDCCH, the object includes at least one of N discontinuous reception groups DRX groups and M cells, and both N and M are positive integers.

Optionally, a value range of N is [1, K], and K is the number of DRX groups configured in a cell group corresponding to the PS-PDCCH; and/or a value range of M is [1, L], and L is the number of cells configured in the cell group corresponding to the PS-PDCCH.

Optionally, the first configuration parameter includes at least one of the following:

an identifier of each of the N DRX groups;
an identifier of each of the M cells, and
an identifier of a cell group corresponding to the N DRX groups or the M cells.

Optionally, the object includes the N DRX groups and the M cells, and a DRX group to which the M cells belong is included in the N DRX groups.

Optionally, in a case that the object includes the N DRX groups and the M cells, the PS-PDCCH is configured to indicate the N DRX groups or the M cells.

Optionally, in a case that a wake-up indication field is configured in downlink control information DCI of the PS-PDCCH, the N DRX groups or the M cells are all indicated by using a same bit in the wake-up indication field; or in a case that a wake-up indication field is configured in DCI of the PS-PDCCH, different DRX groups in the N DRX groups or different cells in the M cells are respectively indicated by using different bits in the wake-up indication field.

Optionally, in a case that different DRX groups in the N DRX groups or different cells in the M cells are respectively indicated by using different bits in the wake-up indication field, a secondary cell dormancy indication field is not configured in the DCI of the PS-PDCCH.

Optionally, in a case that a secondary cell dormancy indication field is configured in DCI of the PS-PDCCH, a secondary cell group SCell group is obtained in a first grouping manner or a second grouping manner, where the first grouping manner is separately executing SCell grouping in each of the N DRX groups to obtain the SCell group, and the second grouping manner is uniformly executing SCell grouping in the N DRX groups to obtain the SCell group.

Optionally, in a case that a wake-up indication field and a secondary cell dormancy indication field are configured in DCI of the PS-PDCCH, and different DRX groups in the N DRX groups are respectively indicated by using different bits in the wake-up indication field, a SCell group is obtained in a third grouping manner, where the third grouping manner is separately executing SCell grouping in each of the N DRX groups to obtain the SCell group.

Optionally, the first configuration parameter further includes a first indication parameter, the first indication parameter is used to instruct the terminal device to execute a first processing behavior, and the first processing behavior includes one of the following:

enabling a DRX On duration timer drx-ondurationtimer in a next DRX cycle of each of the N DRX groups;

determining, according to an indication of the PS-PDCCH, whether to enable a drx-ondurationtimer in a next DRX cycle of each of the N DRX groups;

determining, according to an indication of the PS-PDCCH for a first DRX group, whether to enable a drx-ondurationtimer in a next DRX cycle of the first DRX group and enable a drx-ondurationtimer in a next DRX cycle of a second DRX group;

enabling a drx-ondurationtimer in a next DRX cycle of a first DRX group, and determining, according to an indication of the PS-PDCCH for a second DRX group, whether to enable a drx-ondurationtimer in a next DRX cycle of the second DRX group; and enabling a drx-ondurationtimer in a next DRX cycle of a third DRX group, and determining, according to an indication of the PS-PDCCH for a fourth DRX group, whether to enable a drx-ondurationtimer in a next DRX cycle of the fourth DRX group, where the first DRX group is a DRX group to which a primary cell PCell belongs in the N DRX groups, the second DRX group is a DRX group other than the first DRX group in the N DRX groups, the third DRX group is a DRX group whose running time of a DRX inactivity timer drx-inactivitytimer covers a monitoring occasion MO of the PS-PDCCH in the N DRX groups, and the fourth DRX group is a DRX group other than the third DRX group in the N DRX groups.

Optionally, the first indication parameter is used to instruct the terminal device to execute the first processing behavior in a first case or a second case, where the first case is that a running time of a drx-inactivitytimer of a DRX group to which a first cell belongs covers the MO of the PS-PDCCH, and the first cell is any secondary cell SCell in a cell group corresponding to the PS-PDCCH; and the second case is that a running time of a drx-inactivitytimer of a DRX group to which a second cell belongs covers the MO of the PS-PDCCH, and the second cell is a primary cell in the cell group corresponding to the PS-PDCCH.

Optionally, the obtaining module is configured to execute one of the following:

receiving the first configuration parameter by using radio resource control RRC signaling;

determining the first configuration parameter from I groups of configuration parameters according to received downlink control information DCI signaling or a Media Access Control control element MAC CE, where I is an integer greater than 1; and determining the first configuration parameter from J groups of configuration parameters according to received DCI signaling, where the J groups of configuration parameters are configured by using RRC signaling and activated by using a Media Access Control control element MAC CE, and J is an integer greater than 1.

The terminal device 1800 provided in this embodiment of the present disclosure can implement the processes implemented by the terminal device in the foregoing method embodiment. To avoid repetition, details are not described herein again.

According to the terminal device 1800 in this embodiment of the present disclosure, an obtaining module 1801, configured to obtain a first configuration parameter, where the first configuration parameter is used to indicate an object that can be indicated by a power saving physical downlink control channel PS-PDCCH, and the object includes at least one of N discontinuous reception groups DRX groups and M cells. In this way, a manner of configuring an indication range of a PS-PDCCH in a case that one or more DRX groups are configured in one cell group is provided, thereby improving flexibility of indicating at least one of a DRX group and a cell based on the PS-PDCCH.

Figure 19:
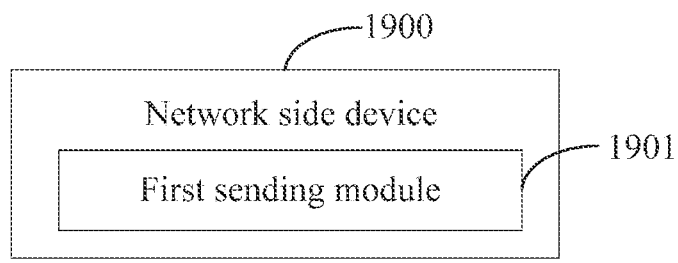
FIG. 19 is a structural diagram of a network side device according to an embodiment of the present disclosure.

Referring to FIG. 19, FIG. 19 is a structural diagram of a network side device according to an embodiment of the present disclosure. As shown in FIG. 19, a network side device 1900 includes:

a first sending module 1901, configured to send a first configuration parameter to a terminal device, where the first configuration parameter is used to indicate an object that can be indicated by a power saving physical downlink control channel PS-PDCCH, the object includes at least one of N discontinuous reception groups DRX groups and M cells, and both N and M are positive integers.

Optionally, in a case that a wake-up indication field is configured in downlink control information DCI of the PS-PDCCH, the N DRX groups or the M cells are all indicated by using a same bit in the wake-up indication field; or in a case that a wake-up indication field is configured in DCI of the PS-PDCCH, different DRX groups in the N DRX groups or different cells in the M cells are respectively indicated by using different bits in the wake-up indication field.

Optionally, in a case that different DRX groups in the N DRX groups or different cells in the M cells are respectively indicated by using different bits in the wake-up indication field, a secondary cell dormancy indication field is not configured in the DCI of the PS-PDCCH.

Optionally, in a case that a secondary cell dormancy indication field is configured in DCI of the PS-PDCCH, a secondary cell group SCell group is obtained in a first grouping manner or a second grouping manner, where the first grouping manner is separately executing SCell grouping in each of the N DRX groups to obtain the SCell group, and the second grouping manner is uniformly executing SCell grouping in the N DRX groups to obtain the SCell group.

Optionally, in a case that a wake-up indication field and a secondary cell dormancy indication field are configured in DCI of the PS-PDCCH, and different DRX groups in the N DRX groups are respectively indicated by using different bits in the wake-up indication field, a SCell group is obtained in a third grouping manner, where the third grouping manner is separately executing SCell grouping in each of the N DRX groups to obtain the SCell group.

Optionally, the first configuration parameter further includes a first indication parameter, the first indication parameter is used to instruct the terminal device to execute a first processing behavior, and the first processing behavior includes one of the following:

enabling a DRX On duration timer drx-ondurationtimer in a next DRX cycle of each of the N DRX groups;

determining, according to an indication of the PS-PDCCH, whether to enable a drx-ondurationtimer in a next DRX cycle of each of the N DRX groups;

determining, according to an indication of the PS-PDCCH for a first DRX group, whether to enable a drx-ondurationtimer in a next DRX cycle of the first DRX group and enable a drx-ondurationtimer in a next DRX cycle of a second DRX group;

enabling a drx-ondurationtimer in a next DRX cycle of a first DRX group, and determining, according to an indication of the PS-PDCCH for a second DRX group, whether to enable a drx-ondurationtimer in a next DRX cycle of the second DRX group; and enabling a drx-ondurationtimer in a next DRX cycle of a third DRX group, and determining, according to an indication of the PS-PDCCH for a fourth DRX group, whether to enable a drx-ondurationtimer in a next DRX cycle of the fourth DRX group, where the first DRX group is a DRX group to which a primary cell PCell belongs in the N DRX groups, the second DRX group is a DRX group other than the first DRX group in the N DRX groups, the third DRX group is a DRX group whose running time of a DRX inactivity timer drx-inactivitytimer covers a monitoring occasion MO of the PS-PDCCH in the N DRX groups, and the fourth DRX group is a DRX group other than the third DRX group in the N DRX groups.

Optionally, the first indication parameter is used to instruct the terminal device to execute the first processing behavior in a first case or a second case, where the first case is that a running time of a drx-inactivitytimer of a DRX group to which a first cell belongs covers the MO of the PS-PDCCH, and the first cell is any secondary cell SCell in a cell group corresponding to the PS-PDCCH; and the second case is that a running time of a drx-inactivitytimer of a DRX group to which a second cell belongs covers the MO of the PS-PDCCH, and the second cell is a primary cell in the cell group corresponding to the PS-PDCCH.

Optionally, the first sending module is configured to:

send I groups of configuration parameters to the terminal device by using RRC signaling, where the I groups of configuration parameters include at least the first configuration parameter, and I is an integer greater than 1; and the network side device further includes a second sending module, configured to execute one of the following:

sending downlink control information DCI signaling to the terminal device, where the DCI signaling is used to determine the first configuration parameter from the I groups of configuration parameters; and sending a Media Access Control control element MAC CE to the terminal device, and sending downlink control information DCI signaling to the terminal device, where the MAC CE is used to instruct to activate J groups of configuration parameters in the I groups of configuration parameters, the DCI signaling is used to determine the first configuration parameter from the J groups of configuration parameters, and J is an integer greater than 1 and less than or equal to I.

The network side device 1900 provided in this embodiment of the present disclosure can implement the processes implemented by the network side device in the foregoing method embodiment. To avoid repetition, details are not described herein again.

According to the network side device 1900 in this embodiment of the present disclosure, a first sending module 1901 is configured to send a first configuration parameter to a terminal device, where the first configuration parameter is used to indicate an object that can be indicated by a power saving physical downlink control channel PS-PDCCH, and the object includes at least one of N discontinuous reception groups DRX groups and M cells. In this way, a manner of configuring an indication range of a PS-PDCCH in a case that one or more DRX groups are configured in one cell group is provided, thereby improving flexibility of indicating at least one of a DRX group and a cell based on the PS-PDCCH.

Figure 20:
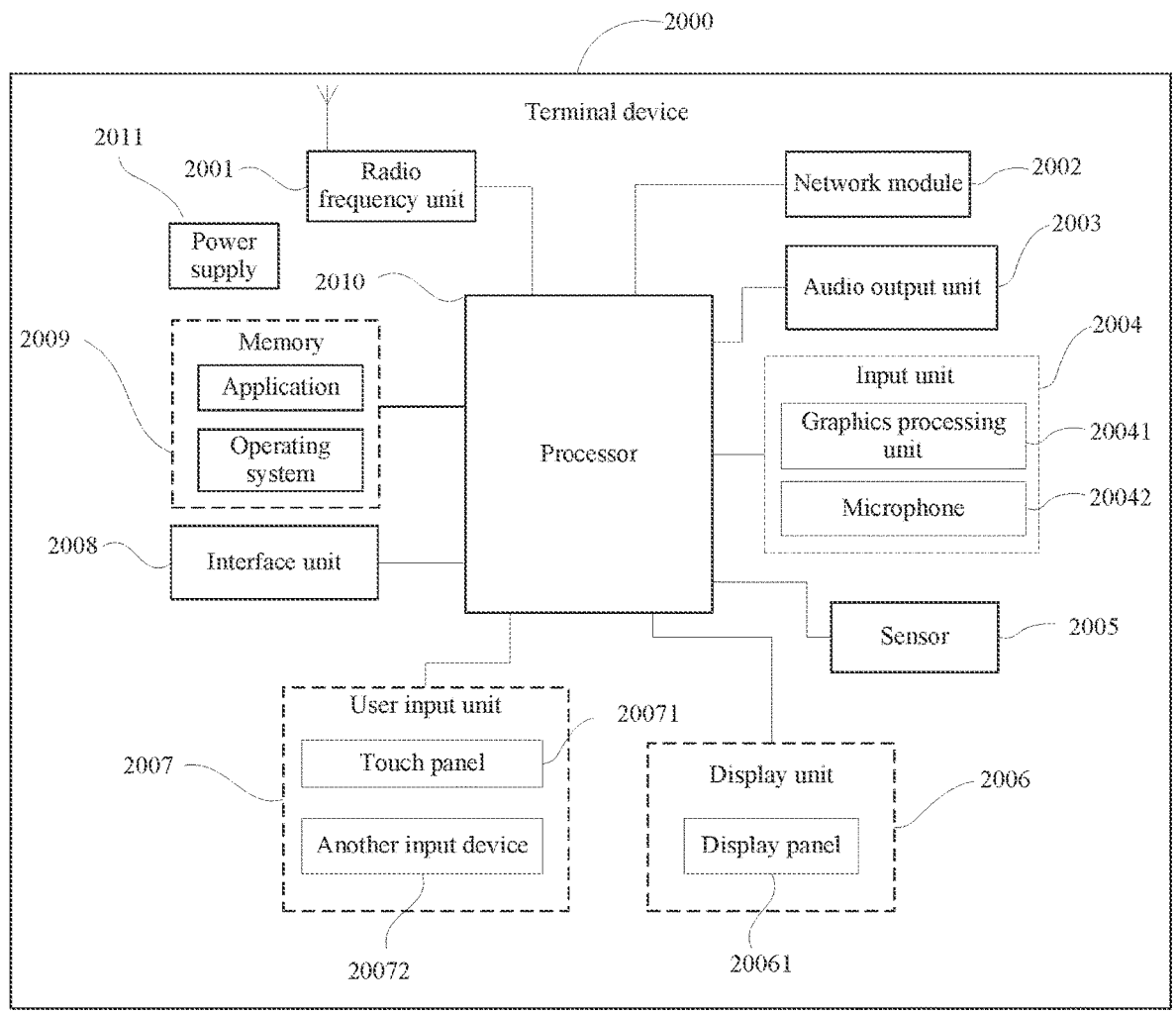
FIG. 20 is a structural diagram of another terminal device according to an embodiment of the present disclosure.

FIG. 20 is a structural diagram of another terminal device according to an embodiment of the present disclosure. Referring to FIG. 20, a terminal device 2000 includes but is not limited to components such as a radio frequency unit 2001, a network module 2002, an audio output unit 2003, an input unit 2004, a sensor 2005, a display unit 2006, a user input unit 2007, an interface unit 2008, a memory 2009, a processor 2010, and a power supply 2011. It can be understood by a person skilled in the art that, the terminal device structure shown in FIG. 20 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, an in-vehicle terminal, a wearable device, a pedometer, and the like.

The processor 2010 is configured to obtain a first configuration parameter, where the first configuration parameter is used to indicate an object that can be indicated by a power saving physical downlink control channel PS-PDCCH, the object includes at least one of N discontinuous reception groups DRX groups and M cells, and both N and M are positive integers.

It should be understood that, in this embodiment of the present disclosure, the radio frequency unit 2001 and the processor 2010 can implement the processes implemented by the terminal device in the foregoing method embodiment. To avoid repetition, details are not described herein again.

It should be understood that, in this embodiment of the present disclosure, the radio frequency unit 2001 may be configured to receive and send information or a signal in a call process. In some embodiments, after receiving downlink data from a base station, the radio frequency unit 2001 sends the downlink data to the processor 2010 for processing. In addition, the radio frequency unit 2001 sends uplink data to the base station. Usually, the radio frequency unit 2001 includes but is not limited to an antenna, at least one amplifier, a transceiver, a coupler, a low noise amplifier, a duplexer, and the like. In addition, the radio frequency unit 2001 may communicate with a network and another device through a wireless communication system.

The terminal device provides wireless broadband Internet access for the user by using the network module 2002, for example, helping the user to send and receive an e-mail, brows a web page, and access streaming media.

The audio output unit 2003 may convert audio data received by the radio frequency unit 2001 or the network module 2002 or stored in the memory 2009 into an audio signal and output the audio signal as a sound. In addition, the audio output unit 2003 may further provide an audio output (for example, a call signal received voice, or a message received voice) related to a specific function implemented by the terminal device 2000. The audio output unit 2003 includes a speaker, a buzzer, a telephone receiver, and the like.

The input unit 2004 is configured to receive an audio signal or a video signal. The input unit 2004 may include a Graphics Processing Unit (GPU) 20041 and a microphone 20042, and the graphics processing unit 20041 processes image data of a still picture or video obtained by an image capture apparatus (such as a camera) in a video capture mode or an image capture mode. A processed image frame may be displayed on the display unit 2006. The image frame processed by the graphics processing unit 20041 may be stored in the memory 2009 (or another storage medium) or sent by using the radio frequency unit 2001 or the network module 2002. The microphone 20042 may receive a sound and can process such sound into audio data. Processed audio data may be converted, in a call mode, into a format that can be sent to a mobile communication base station by using the radio frequency unit 2001 for output.

The terminal device 2000 further includes at least one sensor 2005, such as an optical sensor, a motion sensor, and other sensors. In some embodiments, the light sensor includes an ambient light sensor and a proximity sensor. The ambient light sensor may adjust luminance of the display panel 20061 based on brightness of ambient light. The proximity sensor may turn off the display panel 20061 and/or backlight when the terminal device 2000 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 2005 may further include a fingerprint sensor, a pressure sensor, an iris sensor, a molecular sensor, a gyroscope, a barometer, a hygrometer, a thermometer, an infrared sensor, and the like. Details are not described herein.

The display unit 2006 is configured to display information entered by a user or information provided for a user. The display unit 2006 may include a display panel 20061. The display panel 20061 may be configured in a form of a Liquid Crystal Display (LCD), an Organic Light-Emitting Diode (OLED), or the like.

The user input unit 2007 may be configured to receive input digit or character information, and generate a key signal input related to a user setting and function control of the terminal device. In some embodiments, the user input unit 2007 includes a touch panel 20071 and another input device 20072. The touch panel 20071 is also referred to as a touchscreen, and may collect a touch operation performed by a user on or near the touch panel 20071 (such as an operation performed by a user on the touch panel 20071 or near the touch panel 20071 by using any proper object or accessory, such as a finger or a stylus). The touch panel 20071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 2010, and can receive and execute a command sent by the processor 2010. In addition, the touch panel 20071 may be of a resistive type, a capacitive type, an infrared type, a surface acoustic wave type, or the like. The user input unit 2007 may include another input device 20072 in addition to the touch panel 20071. In some embodiments, the another input device 20072 may include but is not limited to a physical keyboard, a functional button (such as a volume control button or a power on/off button), a trackball, a mouse, and a joystick. Details are not described herein.

Further, the touch panel 20071 may cover the display panel 20061. When detecting the touch operation on or near the touch panel 20071, the touch panel 20071 transmits the touch operation to the processor 2010 to determine a type of a touch event, and then the processor 2010 provides corresponding visual output on the display panel 20061 based on the type of the touch event. In FIG. 20, although the touch panel 20071 and the display panel 20061 are used as two independent parts to implement input and output functions of the terminal device, in some embodiments, the touch panel 20071 and the display panel 20061 may be integrated to implement the input and output functions of the terminal device. This is not specifically limited herein.

The interface unit 2008 is an interface for connecting an external apparatus with the terminal device 2000. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 2008 may be configured to receive input (for example, data information and power) from an external apparatus and transmit the received input to one or more elements in the terminal device 2000 or may be configured to transmit data between the terminal device 2000 and an external apparatus.

The memory 2009 may be configured to store a software program and various data. The memory 2009 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 2009 may include a high-speed random access memory, and may further include a nonvolatile memory, for example, at least one magnetic disk storage device, a flash storage device, or another volatile solid-state storage device.

The processor 2010 is a control center of the terminal device, and connects all the components of the entire terminal device by using various interfaces and lines. By running or executing a software program and/or a module that are/is stored in the memory 2009 and by invoking data stored in the memory 2009, the processor 2010 performs various functions of the terminal device and data processing, to perform overall monitoring on the terminal device. The processor 2010 may include one or more processing units. In some embodiments, an application processor and a modem processor may be integrated into the processor 2010. The application processor mainly processes an operating system, a user interface, an application, and the like. The modem processor mainly processes wireless communications. It can be understood that, in some embodiments, the modem processor may not be integrated into the processor 2010.

The terminal device 2000 may further include the power supply 2011 (such as a battery) that supplies power to each component. In some embodiments, the power supply 2011 may be logically connected to the processor 2010 by using a power supply management system, so as to implement functions such as charging and discharging management, and power consumption management by using the power supply management system.

In addition, the terminal device 2000 includes some function modules not shown, and details are not described herein.

An embodiment of the present disclosure further provides a terminal device, including a processor 2010, a memory 2009, and a computer program that is stored in the memory 2009 and that can be run on the processor 2010. When the computer program is executed by the processor 2010, the processes of the foregoing PS-PDCCH configuration method embodiment are implemented and a same technical effect can be achieved. To avoid repetition, details are not described herein again.

Figure 21:
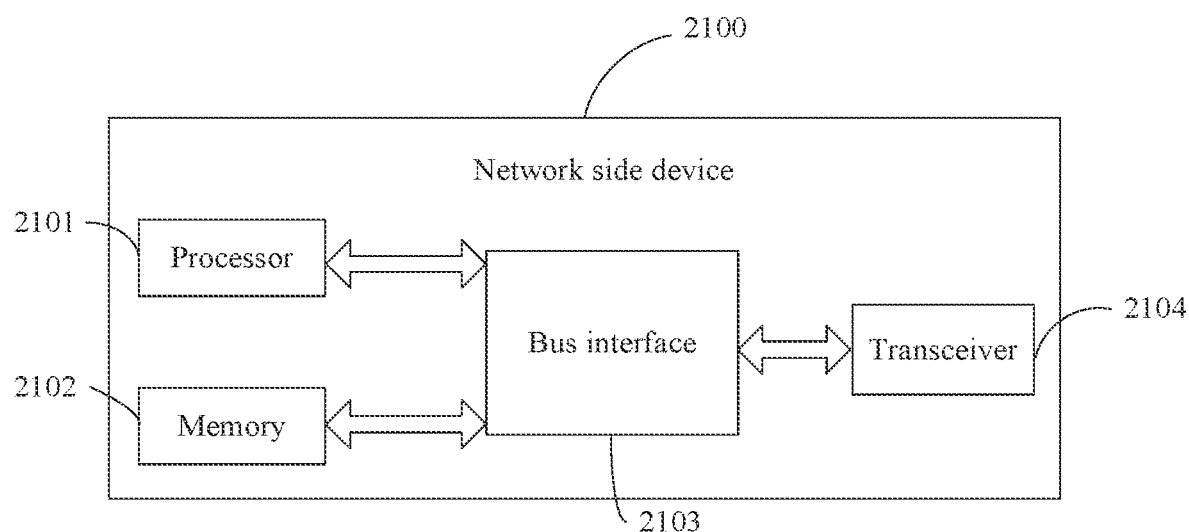
FIG. 21 is a structural diagram of another network side device according to an embodiment of the present disclosure.

Referring to FIG. 21, FIG. 21 is a structural diagram of another network side device according to an embodiment of the present disclosure. As shown in FIG. 21, a network side device 2100 includes a processor 2101, a memory 2102, a bus interface 2103, and a transceiver 2104, where the processor 2101, the memory 2102, and the transceiver 2104 are all connected to the bus interface 2103.

In this embodiment of the present disclosure, the network side device 2100 further includes a computer program that is stored in the memory 2102 and that can be run on the processor 2101.

In this embodiment of the present disclosure, the transceiver 2104 is configured to:

send a first configuration parameter to a terminal device, where the first configuration parameter is used to indicate an object that can be indicated by a power saving physical downlink control channel PS-PDCCH, the object includes at least one of N discontinuous reception groups DRX groups and M cells, and both N and M are positive integers.

It should be understood that, in this embodiment of the present disclosure, the processor 2101 and the transceiver 2104 can implement the processes implemented by the network side device in the foregoing method embodiment. To avoid repetition, details are not described herein again.

An embodiment of the present disclosure further provides a computer-readable storage medium. The computer-readable storage medium stores a computer program, and when the computer program is executed by a processor, the processes of the foregoing PS-PDCCH configuration method embodiment are implemented and a same technical effect can be achieved. To avoid repetition, details are not described herein again. The computer-readable storage medium includes a Read-only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A Power Saving Physical Downlink Control Channel (PS-PDCCH) configuration method, performed by a terminal device, comprising:
   obtaining a first configuration parameter, wherein
   the first configuration parameter indicates at least one of
      N Discontinuous Reception Groups (DRX groups) in a cell group or M cells in the cell group that a PS-PDCCH is configured to indicate, and both N and M are positive integers; and
   processing a DRX On duration timer (drx-ondurationtimer) in a next DRX cycle as instructed by the first configuration parameter.

2. The PS-PDCCH configuration method according to claim 1, wherein a value range of N is [1, K], and K is the number of DRX groups configured in a cell group corresponding to the PS-PDCCH;
   or
   a value range of M is [1, L], and L is the number of cells configured in the cell group corresponding to the PS-PDCCH.

3. The PS-PDCCH configuration method according to claim 1, wherein the first configuration parameter comprises at least one of the following:
   an identifier of each of the N DRX groups;
   an identifier of each of the M cells; or
   an identifier of a cell group corresponding to the N DRX groups or the M cells.

4. The PS-PDCCH configuration method according to claim 1, wherein the first configuration parameter indicates the N DRX groups and the M cells, and a DRX group to which the M cells belong is comprised in the N DRX groups; or,
   the PS-PDCCH is configured to indicate the N DRX groups or the M cells.

5. The PS-PDCCH configuration method according to claim 1, wherein when a wake-up indication field is configured in Downlink Control Information (DCI) of the PS-PDCCH, the N DRX groups or the M cells are all indicated by using a same bit in the wake-up indication field; or
   when a wake-up indication field is configured in DCI of the PS-PDCCH, different DRX groups in the N DRX groups or different cells in the M cells are respectively indicated by using different bits in the wake-up indication field.

6. The PS-PDCCH configuration method according to claim 5, wherein when different DRX groups in the N DRX groups or different cells in the M cells are respectively indicated by using different bits in the wake-up indication field, a secondary cell dormancy indication field is not configured in the DCI of the PS-PDCCH.

7. The PS-PDCCH configuration method according to claim 1, wherein when a secondary cell dormancy indication field is configured in Downlink Control Information (DCI) of the PS-PDCCH, the method further comprises:
   obtaining a Secondary Cell group (SCell group) in a first grouping manner or a second grouping manner, wherein
   obtaining the SCell group in the first grouping manner comprises separately executing SCell grouping in each of the N DRX groups, and obtaining the SCell group in the second grouping manner comprises uniformly executing Scell grouping in the N DRX groups.

8. The PS-PDCCH configuration method according to claim 1, wherein when a wake-up indication field and a secondary cell dormancy indication field are configured in Downlink Control Information (DCI) of the PS-PDCCH, and different DRX groups in the N DRX groups are respectively indicated by using different bits in the wake-up indication field, the method further comprises:
   obtaining a Scell group in a third grouping manner, wherein
   obtaining the Scell group in the third grouping manner comprises separately executing Scell grouping in each of the N DRX groups.

9. The PS-PDCCH configuration method according to claim 1, wherein processing the drx-ondurationtimer in a next DRX cycle as instructed by the first configuration parameter further comprises executing a first processing behavior, comprising one of the following:
   enabling a DRX On duration timer (drx-ondurationtimer) in a next DRX cycle of each of the N DRX groups;
   determining, according to an indication of the PS-PDCCH, whether to enable a drx-ondurationtimer in a next DRX cycle of each of the N DRX groups;
   determining, according to an indication of the PS-PDCCH for a first DRX group, whether to enable a drx-ondurationtimer in a next DRX cycle of the first DRX group and enable a drx-ondurationtimer in a next DRX cycle of a second DRX group;

enabling a drx-ondurationtimer in a next DRX cycle of a first DRX group, and determining, according to an indication of the PS-PDCCH for a second DRX group, whether to enable a drx-ondurationtimer in a next DRX cycle of the second DRX group; or enabling a drx-ondurationtimer in a next DRX cycle of a third DRX group, and determining, according to an indication of the PS-PDCCH for a fourth DRX group, whether to enable a drx-ondurationtimer in a next DRX cycle of the fourth DRX group, wherein the first DRX group is a DRX group to which a Primary Cell (PCell) belongs in the N DRX groups, the second DRX group is a DRX group other than the first DRX group in the N DRX groups, the third DRX group is a DRX group whose running time of a DRX inactivity timer (drx-inactivitytimer) covers a Monitoring Occasion (MO) of the PS-PDCCH in the N DRX groups, and the fourth DRX group is a DRX group other than the third DRX group in the N DRX groups.

10. The PS-PDCCH configuration method according to claim 9, wherein executing the first processing behavior comprises executing the first processing behavior in a first case or a second case, wherein the first case is that a running time of a drx-inactivitytimer of a DRX group to which a first cell belongs covers the MO of the PS-PDCCH, and the first cell is any SCell in a cell group corresponding to the PS-PDCCH; and the second case is that a running time of a drx-inactivitytimer of a DRX group to which a second cell belongs covers the MO of the PS-PDCCH, and the second cell is a primary cell in the cell group corresponding to the PS-PDCCH.

11. The PS-PDCCH configuration method according to claim 1, wherein the obtaining a first configuration parameter comprises one of the following:

receiving the first configuration parameter by using Radio Resource Control (RRC) signaling;

determining the first configuration parameter from I groups of configuration parameters according to received DCI signaling or a Media Access Control Control Element (MAC CE), wherein I is an integer greater than 1; and determining the first configuration parameter from J groups of configuration parameters according to received DCI signaling, wherein the J groups of configuration parameters are configured by using RRC signaling and activated by using a MAC CE, and J is an integer greater than 1.

12. A Power Saving Physical Downlink Control Channel (PS-PDCCH) configuration method, performed by a network side device, comprising:

generating a first configuration parameter that indicates at least one of N Discontinuous Reception Groups (DRX groups) in a cell group or M cells in the cell group that a PS-PDCCH is configured to indicate, and both N and M are positive integers; and sending the first configuration parameter to a terminal device.

13. The PS-PDCCH configuration method according to claim 12, wherein when a wake-up indication field is configured in Downlink Control Information (DCI) of the PS-PDCCH, the N DRX groups or the M cells are all indicated by using a same bit in the wake-up indication field; or when a wake-up indication field is configured in DCI of the PS-PDCCH, different DRX groups in the N DRX groups or different cells in the M cells are respectively indicated by using different bits in the wake-up indication field.

14. The PS-PDCCH configuration method according to claim 13, wherein when different DRX groups in the N DRX groups or different cells in the M cells are respectively indicated by using different bits in the wake-up indication field, a secondary cell dormancy indication field is not configured in the DCI of the PS-PDCCH.

15. The PS-PDCCH configuration method according to claim 12, wherein when a secondary cell dormancy indication field is configured in Downlink Control Information (DCI) of the PS-PDCCH, a Secondary Cell group (SCell) group is obtained in a first grouping manner or a second grouping manner, wherein the first grouping manner is separately executing SCell grouping in each of the N DRX groups to obtain the SCell group, and the second grouping manner is uniformly executing SCell grouping in the N DRX groups to obtain the SCell group.

16. The PS-PDCCH configuration method according to claim 12, wherein when a wake-up indication field and a secondary cell dormancy indication field are configured in Downlink Control Information (DCD) of the PS-PDCCH, and different DRX groups in the N DRX groups are respectively indicated by using different bits in the wake-up indication field, a SCell group is obtained in a third grouping manner, wherein the third grouping manner is separately executing SCell grouping in each of the N DRX groups to obtain the SCell group.

17. The PS-PDCCH configuration method according to claim 12, wherein the first configuration parameter further comprises a first indication parameter, the first indication parameter is used to instruct the terminal device to execute a first processing behavior, and the first processing behavior comprises one of the following:

enabling a DRX On duration timer (drx-ondurationtimer) in a next DRX cycle of each of the N DRX groups;

determining, according to an indication of the PS-PDCCH, whether to enable a drx-ondurationtimer in a next DRX cycle of each of the N DRX groups;

determining, according to an indication of the PS-PDCCH for a first DRX group, whether to enable a drx-ondurationtimer in a next DRX cycle of the first DRX group and enable a drx-ondurationtimer in a next DRX cycle of a second DRX group;

enabling a drx-ondurationtimer in a next DRX cycle of a first DRX group, and determining, according to an indication of the PS-PDCCH for a second DRX group, whether to enable a drx-ondurationtimer in a next DRX cycle of the second DRX group; or enabling a drx-ondurationtimer in a next DRX cycle of a third DRX group, and determining, according to an indication of the PS-PDCCH for a fourth DRX group, whether to enable a drx-ondurationtimer in a next DRX cycle of the fourth DRX group, wherein the first DRX group is a DRX group to which a Primary Cell (PCell) belongs in the N DRX groups, the second DRX group is a DRX group other than the first DRX group in the N DRX groups, the third DRX group is a DRX group whose running time of a DRX inactivity timer (drx-inactivitytimer) covers a Monitoring Occasion (MO) of the PS-PDCCH in the N DRX groups, and the fourth DRX group is a DRX group other than the third DRX group in the N DRX groups.

18. The PS-PDCCH configuration method according to claim 17, wherein the first indication parameter is used to instruct the terminal device to execute the first processing behavior in a first case or a second case, wherein the first case is that a running time of a drx-inactivitytimer of a DRX group to which a first cell belongs covers the MO of the PS-PDCCH, and the first cell is any SCell in a cell group corresponding to the PS-PDCCH; and the second case is that a running time of a drx-inactivitytimer of a DRX group to which a second cell belongs covers the MO of the PS-PDCCH, and the second cell is a primary cell in the cell group corresponding to the PS-PDCCH.

19. A terminal device, comprising: a memory having a computer program stored thereon; and a processor, wherein the computer program, when executed by the processor, causes the processor to perform a Power Saving Physical Downlink Control Channel (PS-PDCCH) configuration method, comprising:

obtaining a first configuration parameter, wherein the first configuration parameter indicates at least one of N Discontinuous Reception Groups (DRX groups) in a cell group or M cells in the cell group a PS-PDCCH is configured to indicate, and both N and M are positive integers; and processing a DRX On duration timer (drx-ondurationtimer) in a next DRX cycle as instructed by the first configuration parameter.

20. A network side device, comprising a processor, a memory, and a computer program that is stored in the memory and that can be run on the processor, wherein when the computer program is executed by the processor, the steps of the PS-PDCCH configuration method according to claim 12 are implemented.

* * * * *